United States Patent [19]

Ida et al.

[11] Patent Number: 5,029,036
[45] Date of Patent: Jul. 2, 1991

[54] NORMAL/REVERSE MODE CHANGING MECHANISM FOR TAPE TRANSPORT APPARATUS

[75] Inventors: Mitsuru Ida, Saitama; Yasuhiro Yamaguchi, Kanagawa, both of Japan

[73] Assignee: Sony Corporation, Tokyo, Japan

[21] Appl. No.: 436,422

[22] Filed: Nov. 14, 1989

[30] Foreign Application Priority Data

Nov. 18, 1988 [JP] Japan .................................. 63-293353

[51] Int. Cl.$^5$ ............................................ G11B 15/44
[52] U.S. Cl. ..................................... 360/137; 360/74.1
[58] Field of Search ................ 360/137, 85, 96.3, 74.1

[56] References Cited

U.S. PATENT DOCUMENTS 4,547,823 10/1985 Ri et al. ............................... 360/137
4,831,660 5/1989 Koga et al. .......................... 360/137

*Primary Examiner*—John H. Wolff
*Assistant Examiner*—Craig A. Renner
*Attorney, Agent, or Firm*—Hill, Van Santen, Steadman & Simpson

[57] ABSTRACT

A normal/reverse mode changing mechanism for a tape transport apparatus comprises a mode selecting lever, cam arrangement, and an electromagnet, and one of two tape running modes is selectively obtained due to changing the number of current pulses supplies to the electromagnet. The mode selecting lever has such a function as to move a plurality of controlling members, such as a drive gear engaged selectively with one of the reel base gears, and a lever, which can selectively press one of the two pinch rollers against the corresponding one of two capstans for controlling the direction in which the tape is running. The cam arrangement has such a function as to hold the mode selecting lever selectively in one of two positions: a first position for obtaining the first tape running mode by a combination of a first pinch roller and a first capstan, and a second position for obtaining the second tape running mode by another combination of a second pinch roller and a second capstan. The electromagnet has such a function as to control the angle of rotation of the cam arrangement and the position of the mode selecting lever.

14 Claims, 31 Drawing Sheets

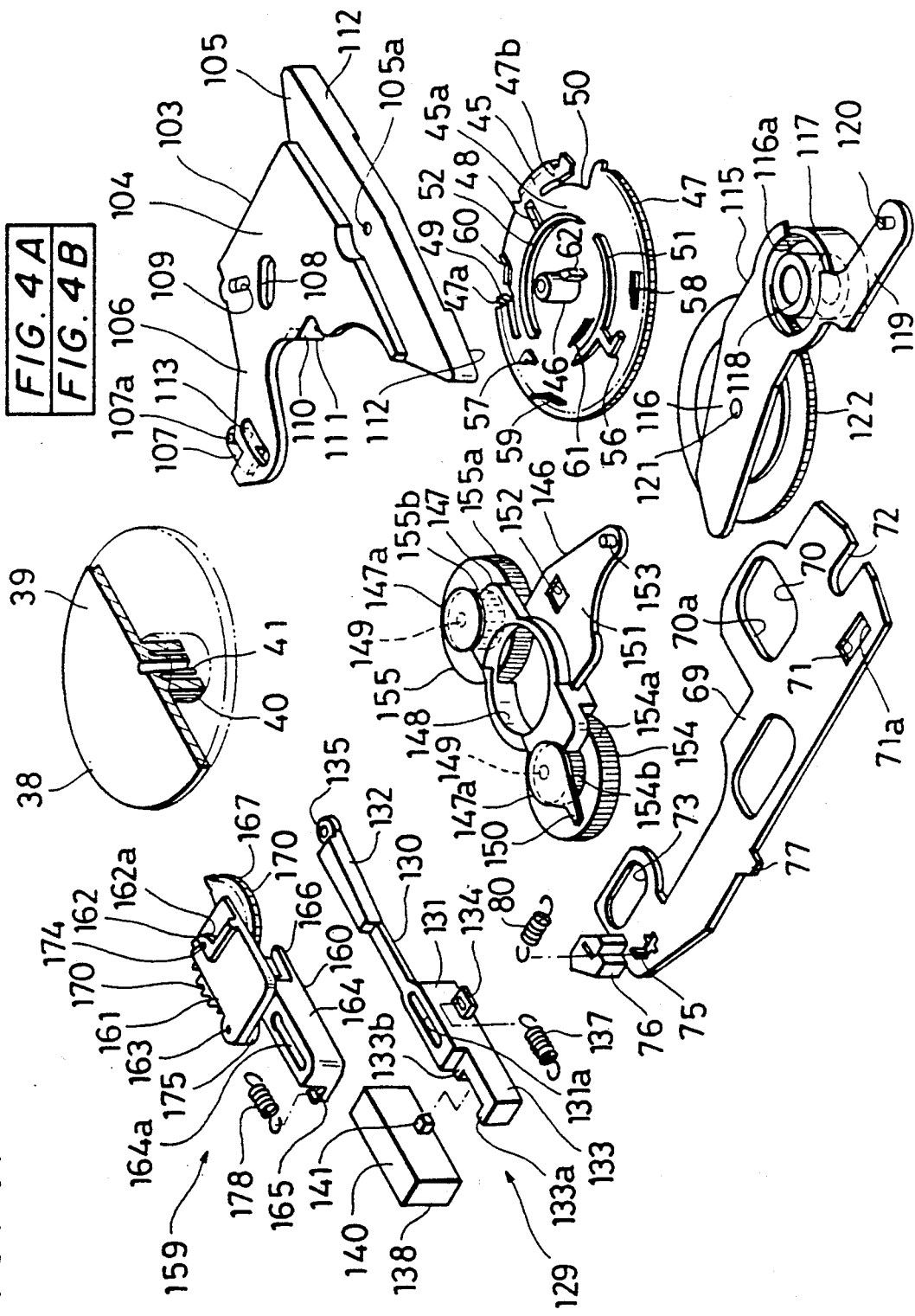

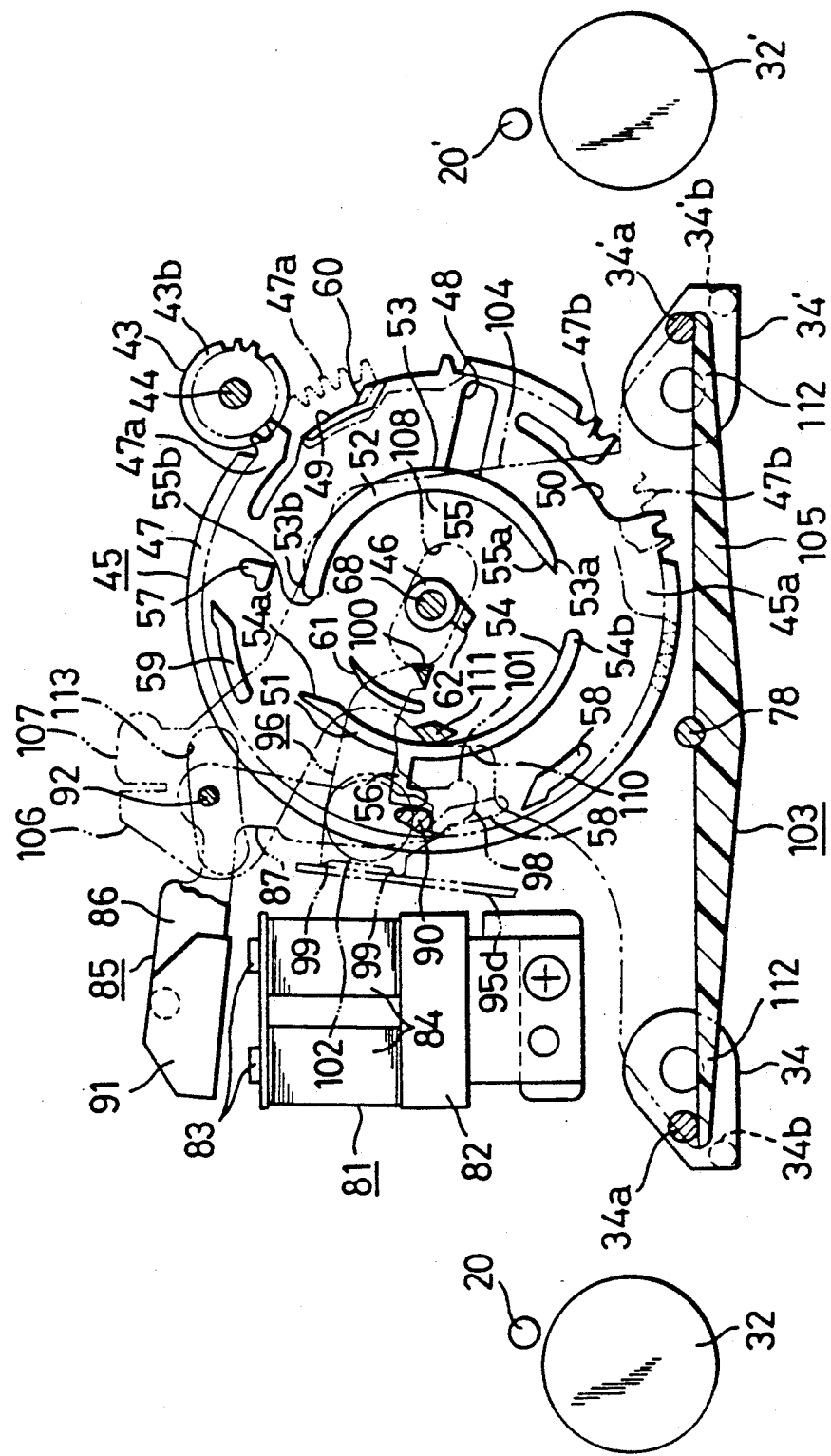

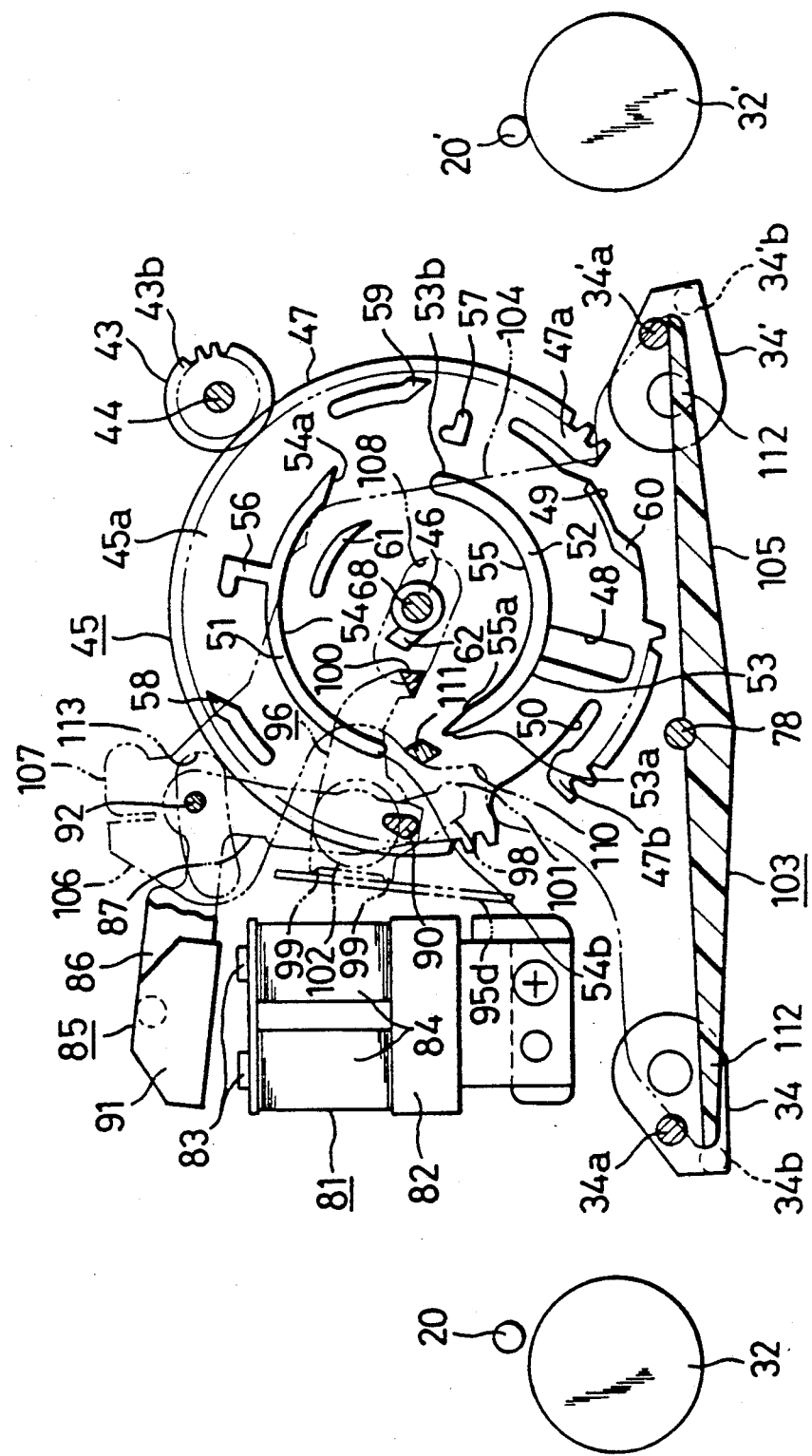

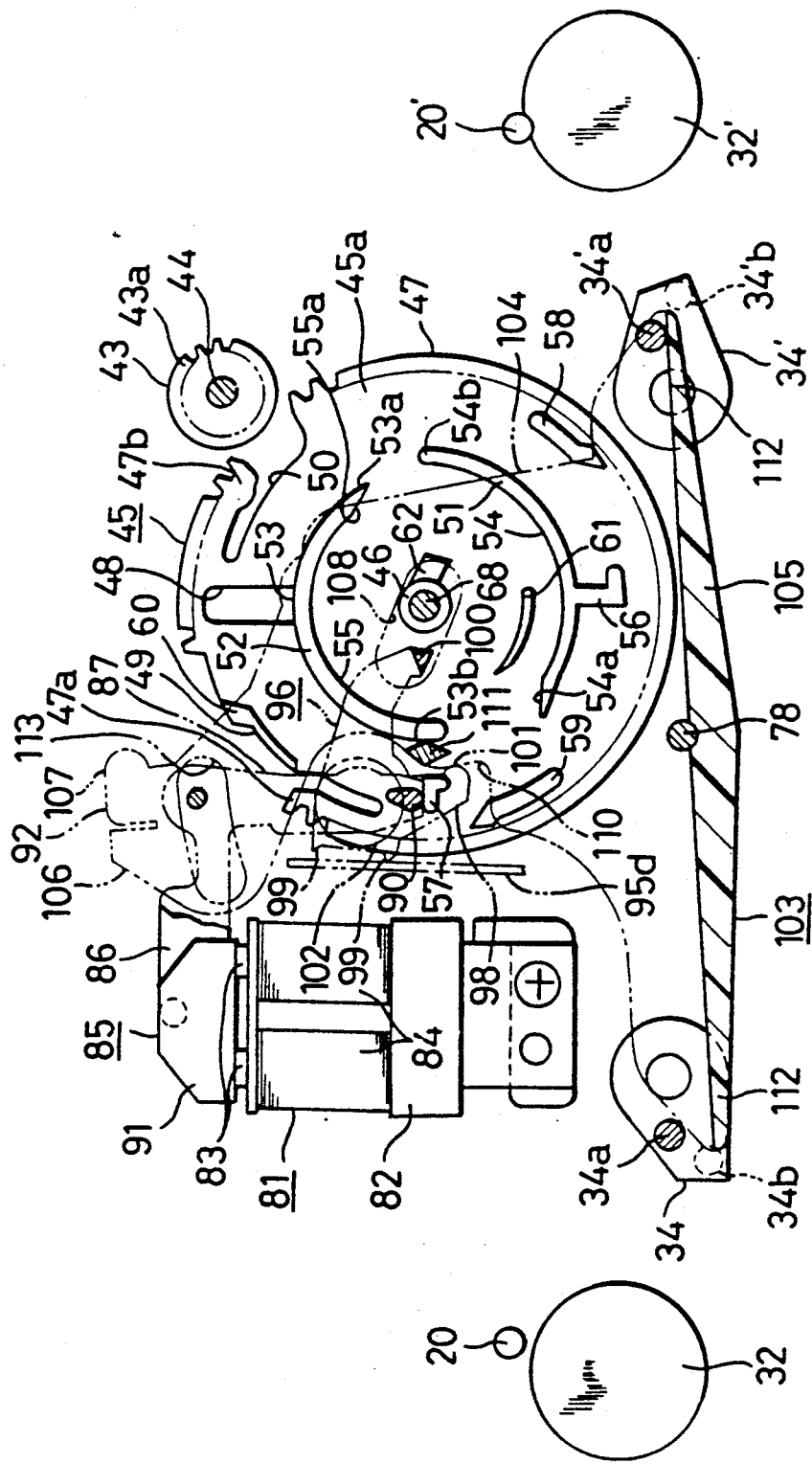

NORMAL/REVERSE MODE CHANGING MECHANISM FOR TAPE TRANSPORT APPARATUS

BACKGROUND OF THE INVENTION

1. Field of the Invention

This invention relates to a normal/reverse mode changing mechanism for a newly developed tape transport apparatus, that is, such a mode changing mechanism as to make a tape, which is sandwiched between and driven by a capstan and pinch roller, selectively run in either a first tape transport direction or a second tape transport direction that is in reverse to the first tape transport direction.

Some improvements will be carried out as to a regulating member for regulating the tape transport direction. The regulating member comprises a movable member for transferring the pinch roller and a driving gear that is selectively engaged to one of two reel bases to drive the selected base; and control means for controlling the motion of the movable member which is moved between a first position where a first tape transport mode is obtained and a second position where a second tape transport mode is obtained.

To make one of the two tape transport modes selectively obtainable, a mode changing mechanism of the tape transport apparatus, which merely comprises one movable member, cam means and an electromagnet, will be proposed.

2. Description of the Prior Art

In general, a tape transport apparatus, such as a tape recorder, comprises a pair of reel bases on which a pair of tape reels are mounted, respectively; a transferal gear driven by a motor and capable of selectively engaging one of the pair of reel bases; a capstan driven by the motor; and a pinch roller, and when recording or reproducing is performed, a magnetic tape is firmly sandwiched between the rotated capstan and the pinch roller so as to be run at a constant speed. Simultaneously, one of the pair of reel bases is engaged by the transferable gear, and takes up the magnetic tape which is fed from between the capstan and the pinch roller. Next, when the apparatus is in the fast forward or the rewind mode, one of the pair of reel bases is rotated at a high speed in a direction for taking up the magnetic tape under such a state as to have the pinch roller separated from the capstan.

In various kinds of tape recorders, there is a tape recorder, which is capable of recording and reproducing both at a time when the magnetic tape runs in its normal direction, and at a time when the magnetic tape runs in its reverse direction. This tape recorder has generally two capstans and two pinch rollers corresponding to the respective capstans and the two combinations of a capstan and a pinch roller being disposed on opposite sides of a magnetic head used for recording or reproducing.

Thus, when recording or reproducing (hereinafter described as normal play) is performed under such a state as to run the magnetic tape in the normal direction, one of the pinch rollers is pressed against the corresponding capstan, and when recording or reproducing (hereinafter described as reverse play) is performed under such a state as to run the magnetic tape in the reverse direction, the other of the pinch roller is pressed against the corresponding other capstan. Therefore, in such a tape transport apparatus, it becomes necessary to provide a direction mode changing mechanism which is capable of optionally selecting one of the normal play mode and the reverse play mode.

Up to the present, there are various kinds of direction mode changing mechanisms, but in conventional direction mode changing mechanisms, either the means for transferring the transferable gear and means for selectively transferring one of the pinch rollers are different from each other, a motor for driving the transferable gear and pinch rollers differs from the one used for tape transport, or a plurality of electromagnets are used to select optionally one of the normal play mode and the reverse play mode. Thus, the number of parts are apt to increase, and the cost of production rises.

SUMMARY OF THE INVENTION

Accordingly, it is an object of the present invention to provide a normal/reverse mode changing mechanism for a tape transport apparatus in which a transferable gear capable of selectively engaging with one of a pair of reel bases to transmit the power of a motor, a pair of pinch rollers which face respective capstans and are disposed on opposite sides of a magnetic head, and one of which is selectively pressed against the corresponding capstan, and the like are moved by only one direction mode changing member, and the direction mode changing member is controlled by an electromagnet and cam means, so that the number of parts can be reduced, and thereby, it becomes possible to miniaturize the tape transport apparatus, to cheapen the cost of production, and to make it always stable to change the direction mode.

In accordance with an aspect of this invention, a normal/reverse mode changing mechanism for a tape transport apparatus comprises mode selecting lever means being capable of swinging tape-transport-direction selecting lever means so as to engage power transmission gear means, secured to the tape-transport-direction selecting lever means, selectively with one of the two reel bases, and further, pressing one of two pinch rollers against a corresponding capstan, in correspondence with a tape transport direction selected from a first and second direction; driving gear means; cam means including a locking cam, a pushing cam, and a restraining cam which has a first cam and a second cam face, said first cam face can be coupled with a first cam follower provided in the mode selecting lever means to hold the mode selecting lever means in its first position so as to run the tape in the first tape transport direction, said second cam face can be coupled with the first cam follower to hold said mode selecting lever means in its second position so as to run the tape in said second tape transport direction; and the cam means having a peripheral gear which includes a toothless portion capable of facing the driving gear means, and is rotated by the driving gear means when meshed with the driving gear means; biasing means capable of rotating said cam means only in a predetermined direction; electromagnet means; first controlling lever means which is swung to disengage a second cam follower provided therein from the locking cam when a current is supplied to the electromagnet means; second controlling lever means having a third cam follower which is coupled with the pushing cam of the cam means as the cam means is rotated, the first cam follower of the mode selecting lever means being coupled with the first cam face of the restraining cam, while the third cam follower being coupled with the second cam face of the restraining cam; and current supply means for supplying currents to the electromagnet means, the first cam follower of the mode selecting lever means being automatically coupled with the first cam face of the restraining cam, if a current is supplied once when the tape is to be run in the first tape transport direction, and the first cam follower being automatically coupled with the second cam face of the restraining cam if a current is supplied twice when the tape is to be run in the second tape transport direction.

The above, and other objects, features and advantages of this invention, will be apparent in the following detailed description of an illustrative embodiment thereof which is to be read in connection with the accompanying drawings wherein like reference numerals identify the corresponding parts in the several views.

BRIEF DESCRIPTION OF THE DRAWINGS

FIGS. 10A to 10D are plan views which illustrate, in turn, the motion of various parts that are incorporated in the tape transport apparatus embodying the invention, until the normal play mode of the apparatus is obtained;

FIGS. 11A to 11C are plan views which illustrate, in turn, the motion of various parts that are, incorporated in the tape transport apparatus embodying the invention, until the reverse play mode of the apparatus is obtained;

DETAILED DESCRIPTION OF A PREFERRED EMBODIMENT

The drawings illustrate a cam mechanism embodying the present invention and its application to a tape transport apparatus in order to control a time for setting a mode changing mechanism of the apparatus in motion.

Figure 1:
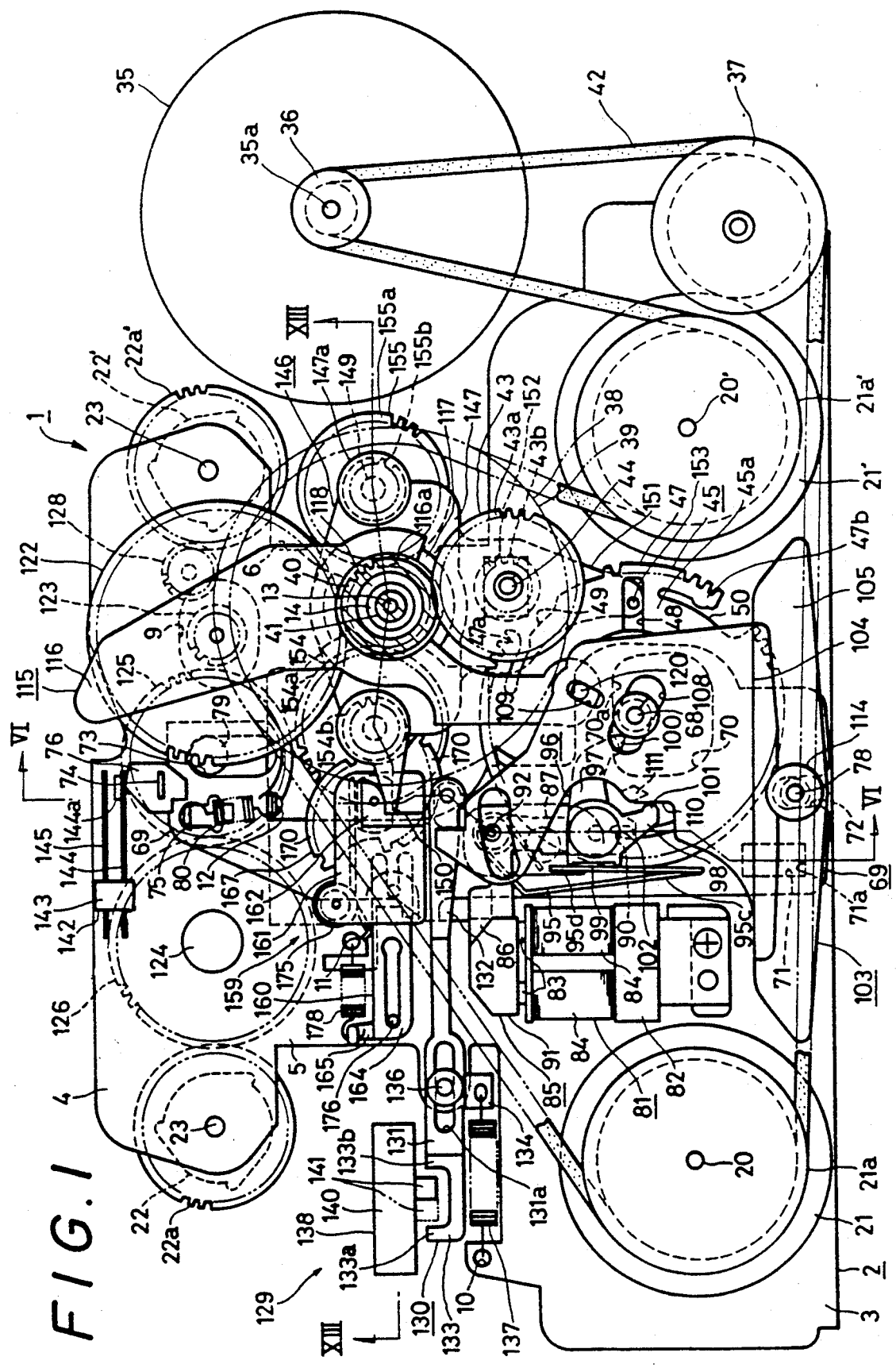
FIG. 1 is a bottom view of a tape transport apparatus according to an embodiment of this invention.

FIG. 1 shows a general bottom view of the tape transport apparatus, generally indicated at 1. The right, the left, the forward, and the rear sides of the apparatus viewed from under the apparatus, correspond with the respective sides of FIG. 1, and the upper and the lower sides of the apparatus correspond in reverse with the respective sides of FIG. 1.

Figure 4B:
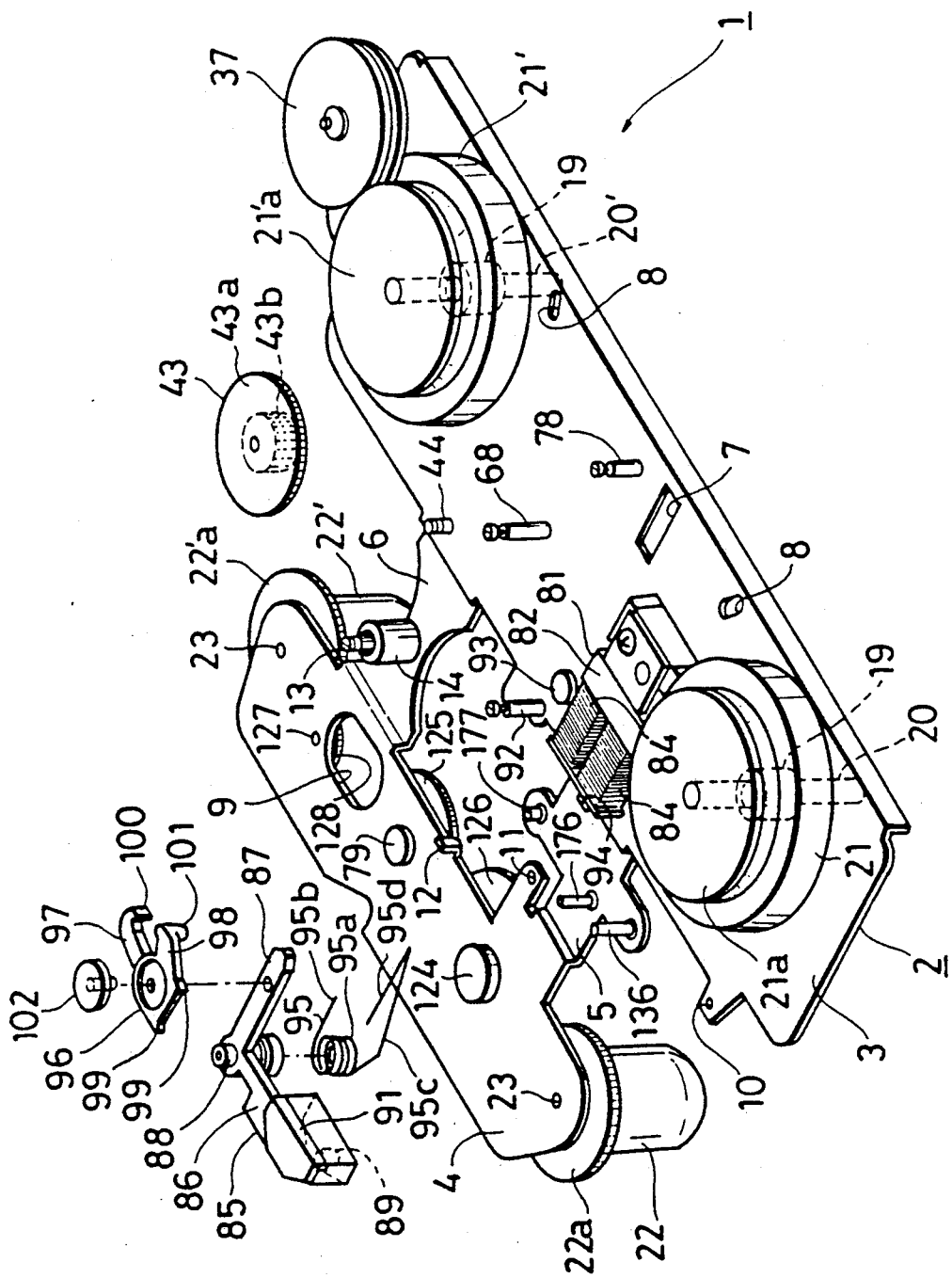
FIGS. 4 (A, B) an exploded, perspective view, partly broken away, of the tape transport apparatus of FIG. 1.

A chassis 2 comprises a laterally long forward portion 4 and rear portions 3, and a pair of right and left intermediate portions 6 and 5 which are depressed out of the plane of the forward and rear portions 4 and 3 as shown in FIG. 4. The rear portion 3 has a rectangular hole 7, which is located substantially in the center of the portion 3 and extends in the longitudinal direction of the chassis 2, and a pair of right and left elongate holes 8, which are spaced away from the respective right and left sides of the rectangular hole 7. Next, in the forward portion 4 of the chassis 2, there is an elongate opening 9, which is located at the right of a center of the portion 4. In addition, spring stops or anchors 10, 11 and 12 are provided at the left of the forward edge of the rear portion 3, at the right of the left intermediate portion 5, and in the center of the rear edge of the forward portion 4, respectively. A shaft 13 on which a rotating member 38 is rotated, and a hollow shaft 14 which is coaxial with the shaft 13 and on which a lever 115 is swung, project downwards from the center of the right intermediate portion 6 of the chassis 1.

Figure 2:
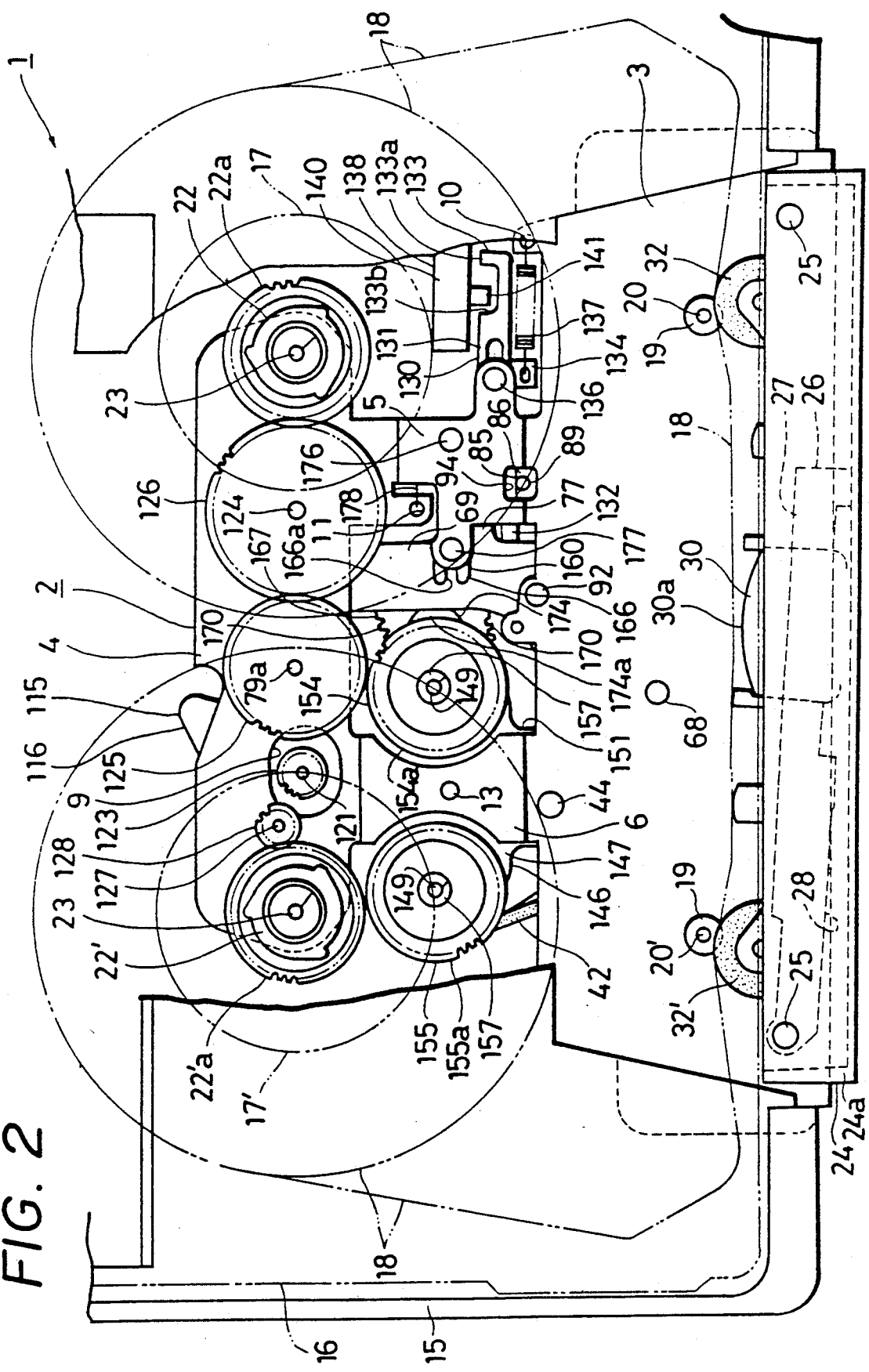
FIG. 2 is a top plan view of the tape transport apparatus of FIG. 1.

As shown in FIG. 2, a tape cassette mounting table 15 is fixed to the chassis 2 and a tape cassette 16 is mounted on the table 15. Within the cassette 16, both ends of a magnetic tape 18 are secured to a pair of right and left tape reels 17 and 17', respectively. These reels are hereinafter denoted by N-reel 17 and R-reel 17'.

As shown in FIG. 2, a pair of right and left capstans 20 and 20' rotate in respective bearings 19 which project from the chassis 2, and fixed to the lower ends of the capstans 20 and 20', are respective fly wheels 21 and 21'.

The fly wheels 21 and 21' have pulley portions 21a and 21'a at the lower ends thereof as shown in FIG. 4.

As shown in FIG. 2, a pair of right and left reel bases 22 and 22' are rotatably supported by a pair of right and left spindles 23, which project upwards from the forward portion 4 of the chassis 2 and have respective gears 22a and 22'a at the lower ends thereof. These reel bases are hereinafter denoted by N-reel-base 22 and R-reel-base 22', respectively.

Figure 3:
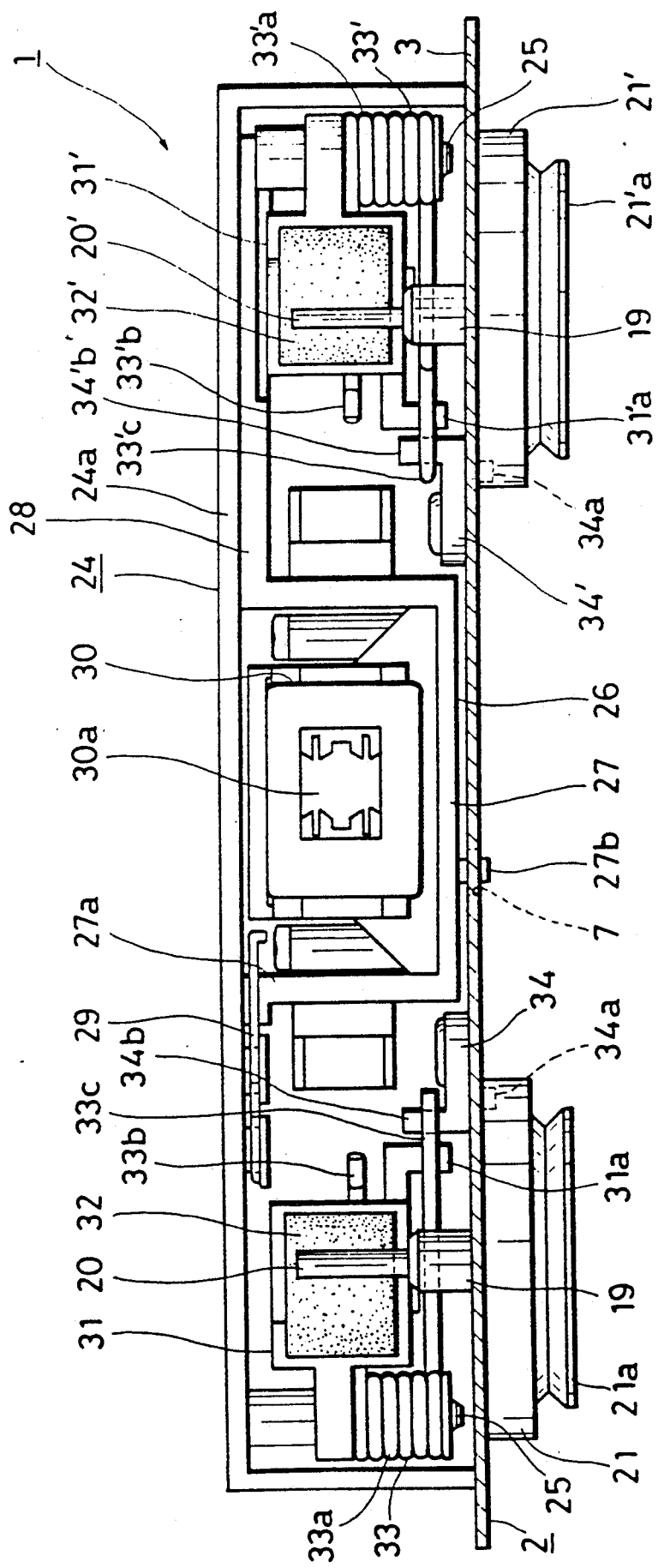
FIG. 3 is a cross sectional view adjacent a front side of the tape transport apparatus of FIG. 1 showing a magnetic head.

As shown in FIGS. 2 and 3, a laterally long head mounting chassis 24, which is formed as a portal frame, is supported by the chassis 2 at the rear side thereof, and near the both ends of the horizontal portion 24a of the chassis 24, respective shafts 25 are so provided as to project downwards. A head holder 26, which comprises a U-shaped portion 27 and a horizontal portion 28 which extends from the upper end of the portion 27 to the right in FIG. 3, is horizontally swung on the right shaft 25 in FIG. 3, and the upper end of a left vertical member 27a of the head holder 26 (shown in FIG. 3) is urged by a return spring 29 in the rear direction of the apparatus 1, so as to be pressed against the rear wall which extends downwards from the horizontal portion 24a of the chassis 24.

As shown in FIG. 3, a projection 27b, which projects from the lower face of the U-shaped portion 27 of the holder 26, is loosely fitted into the rectangular hole 7 provided in the chassis 2. A magnetic head 30 is fixed to the U-shaped portion 27 of the holder 26, and a tape contact surface 30a of the head 30 faces to the front as shown in FIG. 3. A pair of pinch-roller supporting levers 31 and 31' are horizontally swung on the respective shafts 25, and two rollers 32 and 32' are rotatably secured to the respective free ends of the levers 31 and 31' to be in opposed relation to the capstans 20 and 20'. A pair of springs 33 and 33' shown in FIG. 3 are provided so as to be able to press the pinch rollers 32 and 32' against the respective capstans 20 and 20'. A coiled portion 33a, 33'a of each spring 33, 33' is mounted on the shafts 25, one end 33b, 33'b of each spring 33, 33' abuts against the back of the pinch-roller supporting levers 31, 31', and the other end 33c, 33'c of each springs 33, 33' abuts against the front of a spring stop 31a, 31'a shown in FIG. 3.

Two levers 34 and 34' for swinging the respective pinch-roller supporting levers 31 and 31' are rotatably secured to the upper side of the chassis 2 at the rear end thereof, and two downward projections 34a and 34'a of the levers 34 and 34' are loosely fitted into the respective elongate holes 8. In addition, two upward projections 34b and 34'b of the levers 34 and 34' are positioned in opposed relation to the other ends 33c and 33'c of the spring 33m 33' so as to be capable of abutting from behind thereof as shown in FIG. 3. Thus, when either lever 34 or 34' is pushed forwards at a predetermined time by a mode selecting lever 103 as hereinafter described, the upward projection 34b or 34'b presses the other end 33c or 33'c of the spring 33 or 33', and as the result, the selected pinch-roller supporting lever 31 or 31' is swung in the forward direction, so that the selected pinch roller 32 or 32' is pressed against the respective capstan 20, 20'.

KINDS OF MODES

The fundamental modes selected in the tape transport apparatus 1 are "play mode" for reproducing; "fast forward mode" for running the tape 18 at high speed in a predetermined direction (hereinafter described as "normal direction"); "rewind mode" for running the tape 18 at high speed in a direction reverse of the normal direction, (such a direction is hereinafter described as "reverse direction"); and "stop mode" in which the apparatus 1 is free from the above modes. In addition, in the play mode, there are "normal play mode" for performing reproduction as the tape 18 is moved in the normal direction; and "reverse play mode" for performing another reproduction as the tape 18 is moved or conveyed in the reverse direction.

When the tape cassette 16 is mounted on the table 15, the tape reels 17, 17' are engaged with the reel base 22, 22', and both the magnetic head 30 and the pinch rollers 32, 32' face the tape 18 from behind the tape 18 and on a portion of the tape 18 which is guided along one side of the tape cassette 16.

When the normal play mode is selected, the head holder 26 is swung in the forward direction so that the tape contact surface 30a of the magnetic head 30 may come into contact with the tape 18, and the tape 18 may be sandwiched between the right pinch roller 32 (FIG. 2) and the capstan 20 which is rotated counterclockwise in FIG. 2. Thus, the tape 18 is run or moved in the normal direction, that is, in a direction with the tape 18 being supplied from the R-reel 17' and being taken up by the N-reel 17. Simultaneously, N-reel-base 22 is rotated counterclockwise, as illustrated in FIG. 2 and in a direction of taking up the tape 18, so that the N-reel 17 in FIG. 2 is rotated counterclockwise.

When the reverse play mode is selected, the tape is sandwiched between the left pinch roller 32' (FIG. 2) and the capstan 20' which, as illustrated in FIG. 2, is rotated clockwise so that the tape 18 is moved in the reverse direction, that is, in a direction with the tape 18 being supplied from the N-reel 17 and being taken up by the R-reel 17'. Simultaneously, as illustrated in FIG. 2, the R-reel-base 22' is rotated clockwise that is in a direction of taking up the tape 18, so that R-reel 17' is rotated clockwise.

When the fast forward mode is selected, N-reel-base 22 is rotated at high speed in the direction for taking up the tape 18, and when the rewind mode is selected, R-reel-base 22' is rotated at high speed in the direction for taking up the tape 18.

The different mode selections, which were described above, are performed by selectively pushing one of the mode selecting buttons (not shown). When the play button is pushed, the normal and reverse play modes alternate with each other. In addition, if one of the other kinds of mode has been selected, and then a play mode is selected, the mode is automatically returned to the last previously selected play mode. In addition, to obtain one of the play mode, the fast mode, and the rewind mode, a corresponding button should be pushed when the apparatus 1 is in the stop mode. However, if any of the buttons of the play mode, the fast mode and the rewind mode is pushed when the apparatus 1 is not in the stop mode, the selected mode is obtained through the stop mode.

In the drawings, FIGS. 1, 7, 8, 16c and 15 illustrate respective states of the stop mode, the normal play mode, the reverse play mode, the fast forward mode, and the rewind mode.

THE DRIVE SYSTEM

A motor 35 (FIG. 1) is fixed to the lower face of the tape cassette mounting table 15, and a motor pulley 36 is secured to a motor shaft 35a of the motor 35. A guide pulley 37 is rotatable on a shaft which projects from the right rear end of the chassis 2, as illustrated in FIG. 1, and as shown in FIG. 4, the shaft 13 projecting from the right intermediate portion 6 of the chassis 2 is fitted into the hollowed boss 41 of a rotating member 38, so that the rotating member 38 is rotatable on the shaft 13 as shown in FIG. 1. It is to be noted that the rotating member 38 comprises a comparatively large pulley 39 and a spur gear 40.

As shown in FIG. 1, an endless belt 42 is looped around the motor pulley 36, the guide pulley 37, the pulley portions 21a and 21'a of the flywheels 21 and 21', and the pulley 39 of the rotating member 38, so that when the motor 35 rotates clockwise, as illustrated in FIG. 1, (such a rotation is hereinafter denoted as "normal rotation"), the left capstan 20 in FIG. 1 and the rotating member 38 are rotated clockwise, and the right capstan 20' is rotated counterclockwise. It is to be noted that the motor 35 rotates in a reverse direction only in the rewind mode, and the rotating member 38 is always rotated while the motor 35 rotates.

An intermediate gear 43, which comprises a coaxially formed large gear 43a and a small gear 43b, rotates on a shaft 44 which projects from the lower face of the chassis 2 as shown in FIG. 4. The large gear 43a is meshed with the gear 40 of the rotating member 38, and the small gear 43b is meshed with a partially toothless gear or segment gear 47 (hereinafter described). The intermediate gear 43 is always rotated while the motor 35 rotates, and is rotated in a counterclockwise direction when the motor 35 rotates in the normal direction.

CAM MEANS 45

Figure 5:
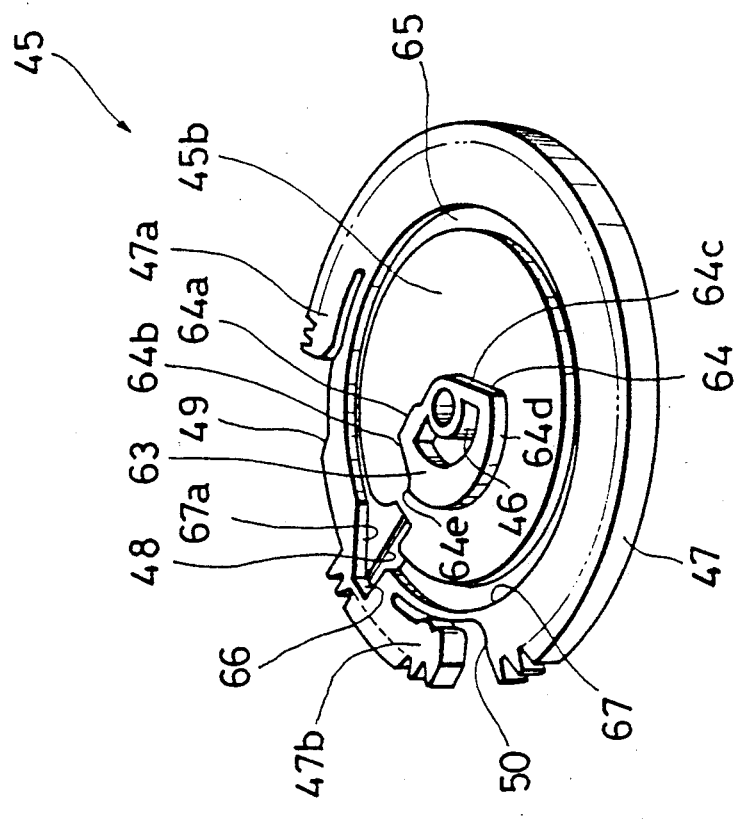
FIG. 5 is a perspective view of a cam means incorporated in the tape transport apparatus embodying the invention.

Cam means 45, the upper side of which is shown in FIG. 5 and the lower side of which is shown in FIG. 4, has a boss 46, the height of which is less on the upper side than the height on the lower side. The gear segment 47 is formed on the outer periphery of the cam means 45, and an elongate hole 48 extends in the radial direction of the cam means 45.

As shown in FIG. 4, a peripheral notch 49 is provided in a position spaced in a counterclockwise direction away from the elongate hole 48 of the cam 45 and forms a first toothless portion 49. Another peripheral notch 50 is provided in a position spaced clockwise from the elongate hole 48 and forms a second toothless portion 50 which is separated by a segment gear portion 47b from the portion 49. The segment gear 47 has a resilient portion 47a on the left side of the notch 49 and the segment gear 47b has a resilient portion on the left side of the notch 50. The free ends of the portions 47a and 47b form a central angle of 90° with each other.

Figure 10A:
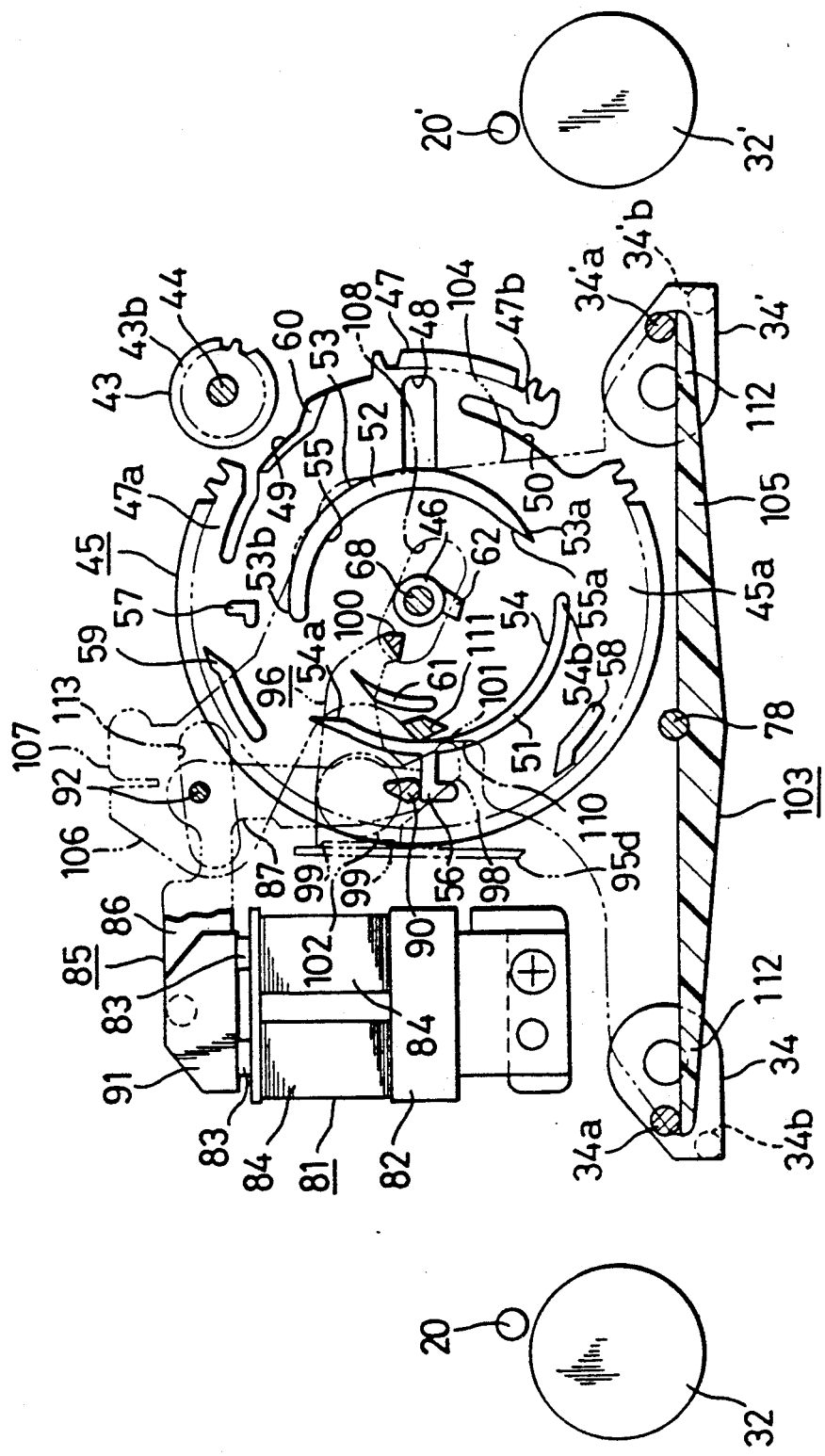

Provided in the lower face of the cam means 45 are two cam projections 51 and 52 which have shapes of circular arc around the center of the cam means 45. In FIG. 10A, the cam means 45 is positioned with the elongate hole 48 being horizontally located and extending at a right angle to a vertical line which passes through the center of the cam means 45. A forward end 54a of the cam projection 51 is on the left side of the vertical line and a rear end 54b is substantially on the vertical line. A forward end 53a and a rear end 53b of the cam projection 52 are respectively on the right side of and on the left side of the above-mentioned vertical line. An outer peripheral surface 53 of the cam projection 52 has substantially the same radius as an inner peripheral surface 54 of the cam projection 51, and the forward ends 54a and 55a of the inner peripheries 54 and 55 form slant surfaces which taper gradually away from the center of the cam means 45.

As shown in FIG. 4, an L-shaped cam projection 56 protrudes from an outer periphery of the cam projection 51, and this cam projection 56 and the elongate hole 48 are located on opposite side of the center of the cam means 45. A second L-shaped cam projection 57 (FIG. 10A) is located between the segment gear 47 and the rear end 53b of the cam projection 52.

As shown in FIG. 10A, cam projections 58, 59 and 60 are arranged near the outer periphery of the cam means 45, and are, respectively, designated as a first, a second and a third return cam projections, which have a dog-legged shape. The forward end of the first cam projection 58 forms a central angle of about 40° with the cam projection 56 in the counterclockwise direction of the cam means 45; the forward end of the second cam projection 59 is located a little apart from the cam projection 57 in the counterclockwise direction of the cam means 45; and the forward end of the third cam projection 60 is located a little apart from the elongate hole 48 in the counterclockwise direction of the cam means 45.

As shown in FIG. 10A, an auxiliary cam projection 61 is provided inside the cam projection 51 and extends along the cam projection 51 from near a mid portion of the cam projection 51 to the forward end of the cam projection 51. A cam projection 62 projects from an outer periphery of the boss 46 and extends obliquely downwards to the left in FIG. 10A.

Figure 9A:
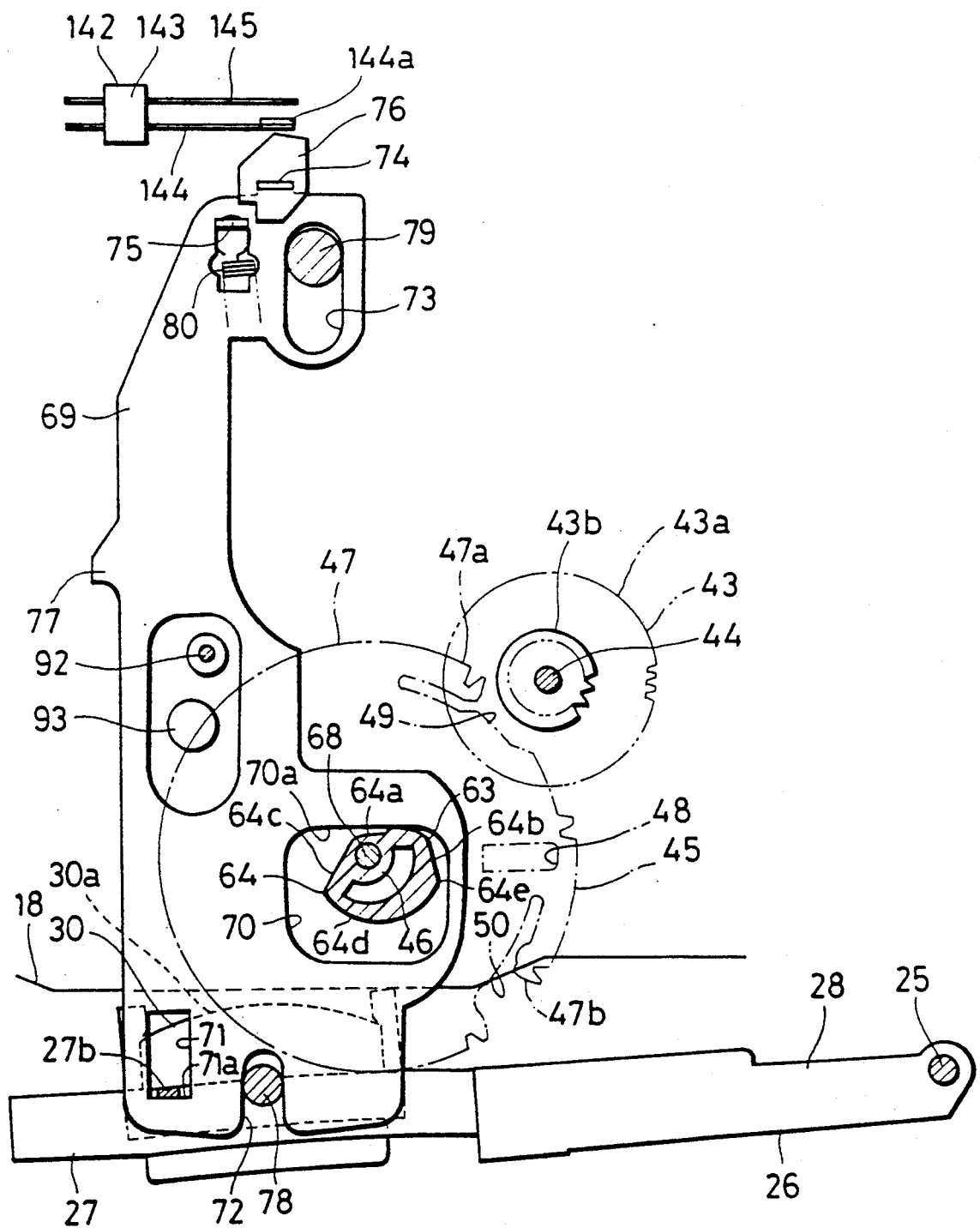
FIGS. 9A to 9C are plan views which illustrate, in turn, the motion of a slider that is incorporated in the tape transport apparatus embodying the invention.

In FIG. 9A which shows the upper side of the cam means 45, and in which the elongate hole 48 is horizontally located at the right, a cam face 64 of a cam projection 63 comprises a first pressed cam face 64a, which faces substantially the front; a second pressed cam face 64b, which is substantially flat and faces substantially the right; a first pressing cam face 64c, which is substantially flat, and faces the upper left; and a second pressing cam face 64d, which is of circular arc shape and faces the rear. A corner where the first pressed cam face 64a and the first pressing cam face 64c are connected to each other is positioned substantially at the center of the cam means 45. The first pressed cam face 64a is upwards convex, the second pressing cam face 64d extends gradually axially away from the center of the cam means 45 in the counterclockwise direction of the cam means 45 and a rear end 64e of the second pressing cam face 64d projects from the second pressed cam face 64b to the right in FIG. 9A.

As shown in FIG. 5, a cam groove 65 is provided in the upper face 45b of the cam means 45, and has the shape of a circle around the center of the cam means 45. The greater part 67 of the cam groove 65 except for a release portion 66 has a constant width substantially equal to the diameter of a projection 153 (FIG. 4) of a fast forward mode/rewind mode selecting lever 146 (hereinafter described), and the release or wide portion 66 (FIG. 5) is provided so as to coincide with the elongate hole 48. The width of the release portion 66 is a little over four times that of the greater part 67 of the cam groove 65. The release portion 66 is connected to one end of the part 67 by a tapered portion 67a, as shown in FIG. 5.

The cam means 45 is rotated on a shaft 68 projecting from the rear portion 3 of the chassis 2 (see FIG. 4) when the segment gear 47 is meshed with the small gear 43b of the intermediate gear 43. For example, when the motor 35 rotates in the clockwise direction in FIG. 1, the cam means 45 is rotated in the clockwise direction in FIG. 1.

However, if the toothless portion 49 or 50 of the gear 47 faces the small gear 43b, the cam means 45 is not rotated. It is to be noted that such a position of the cam means 45 shown in FIGS. 1 and 10A is designated as a first nonrotatable position, and such a position of the cam means 45 shown in FIGS. 10D and 11C is designated as a second nonrotatable position. That is, in the first nonrotatable position, the first toothless portion 49 faces the small gear 43b, and in the second nonrotatable position, the second toothless portion 50 faces the small gear 43b. The two positions of the cam means 45 form a central angle of 270° in the clockwise direction of the cam means 45 in FIG. 1.

SLIDER 69

A slider 69, which is shown in FIGS. 4 and 9A and made of a longitudinally long plate, has a substantially rectangular opening 70 in the right rear side thereof. The opening 70 functions as a follower of the cam projection 63. A substantially rectangular opening 71, which is smaller than the opening 70, is provided at the left rear end of the slider 69, and the projection 27b of the head holder 26, as shown in FIG. 3, is loosely fitted into the opening 71 through the hole 7 of the chassis 2. A guide pin 78 projecting downwards from the chassis 2 (see FIG. 4) is fitted in a U-shaped notch 72 formed on the rear edge of the slider 69 and another guide pin 79 projecting downwards from the chassis 2 is fitted in a longitudinally extending long slot 73, which is formed in the forward portion of the slider 69. Thus, the slider 69 is so guided by the guide pins 78 and 79 as to move within a predetermined range. In addition, between a spring stop or anchor 75 projecting from the forward portion of the slider 69, and the spring stop 12 of the chassis 2, a tension spring 80 is stretched so as to urge the slider 69 in the rear direction as shown in FIG. 1. A projection 74, which projects downwards from the forward edge of the slider 69, and a switch pushing member 76 for pushing a resilient strip 144 of a switch 142 (hereinafter described) is secured to the projection 74. A projection 77 projects from the left edge of the slider 69 to make the slider 69 abut against a translation cam 160 (hereinafter described).

CONTROLLING LEVERS 85 AND 96 SET IN MOTION BY AN ELECTROMAGNET 81

As shown in FIG. 1, an electromagnet 81 has a core 83 made of permanent magnet and surrounded by coils 84, and has a base portion 82 secured to the lower face of the chassis 2. Thus, when a current is not supplied, an armature 91 (FIG. 4), which is secured to an end of a main controlling lever 85, is attracted by the power of the permanent magnet 83, and when the current is passed through the coils 84 to demagnetize the permanent magnet 83, or weaken the magnetic property of the magnet 83, the armature 91 becomes free from the power of the magnet 83.

The main controlling lever 85 (FIGS. 4 and 7) is of an L-shape, and comprises a first arm 86 extending in the transverse direction, and a second arm 87 extending in the rear direction from the right end of the first arm 86 and at a right angle thereto. A cylindrical bearing 88 is disposed at the corner of the lever 85, and horizontally rotatable on a shaft 92 which projects downwards from the rear portion 3 of the chassis 2 as shown in FIG. 4. A projection 89 projects upwards from the distal end of the first arm 86, and loosely fitted in a rectangular hole 94 (FIG. 2) which is formed in the chassis 2 just in front of the electromagnet 81 (FIG. 4), so that the swing of the main controlling lever 85 is restrained within a predetermined range.

Next, a projection 90 projecting from the distal end of the second arm 87 is capable of abutting against the cam projections 56 and 57 as shown in FIGS. 10A and 10D. A torsion coiled spring 95 (FIG. 4) has a coiled portion 95a, a straight end portion 95b, another end portion 95c, which is of dog-legged shape, and a folded portion 95d extending from the end of the other end portion 95c. The coiled portion 95a of the spring 95 is mounted on the cylindrical bearing 88, the straight end portion 95b of the spring 95 abuts a spring stop 93 which projects from the rear portion 3 of the chassis 2, and the other end portion 95c of the spring 95 near the coiled portion 95a abuts the first arm 86 of the lever 85 so as to urge the lever 85 in the clockwise direction in FIG. 1.

Figure 12A:
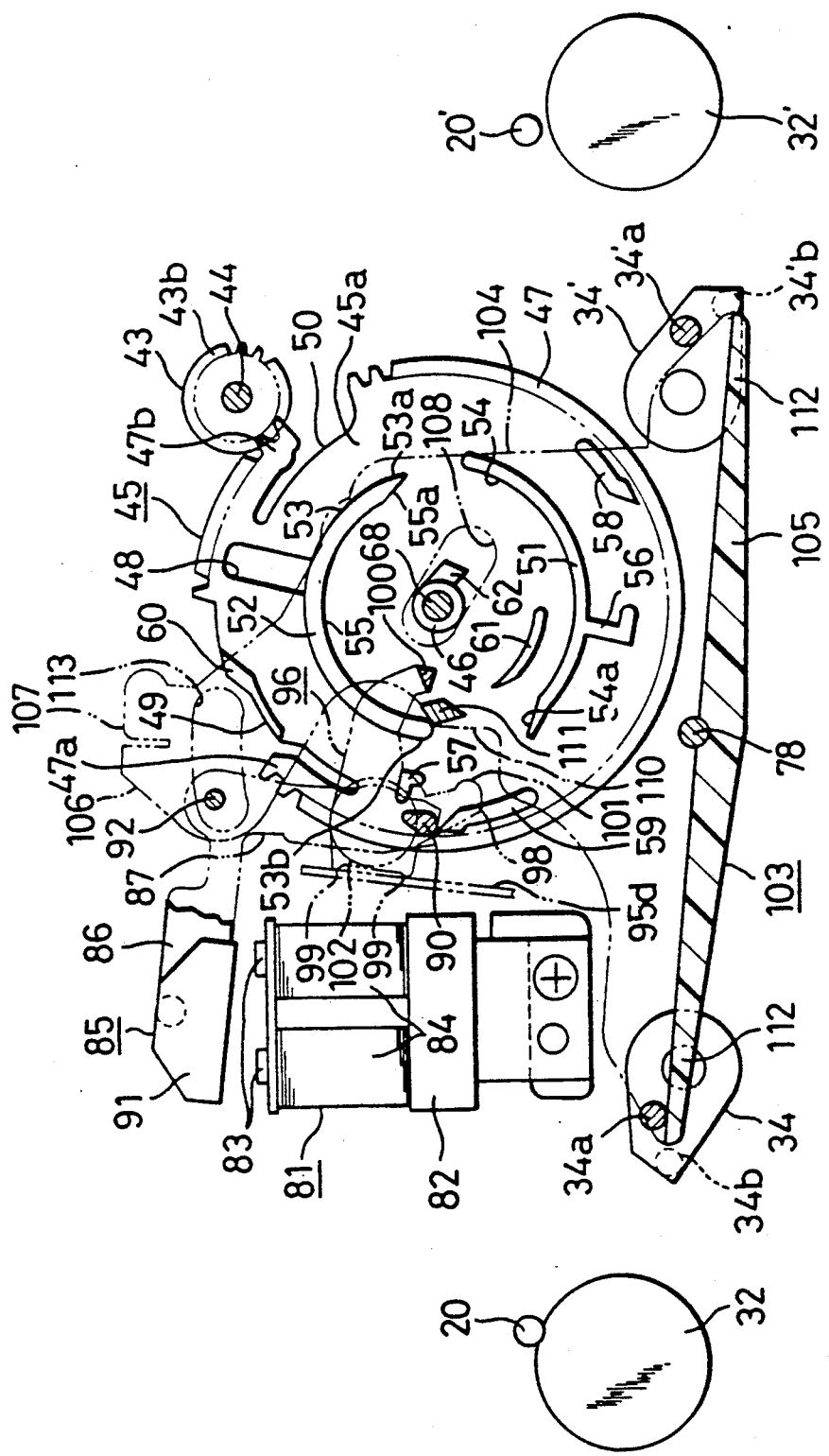
FIGS. 12A and 12B are plan views which illustrate, in turn, the embodiments of various parts that are incorporated in the tape transport apparatus embodying the invention, on the way from the play mode to the stop mode of the apparatus.

Thus, when a current is not supplied to the coils 84 of the electromagnet 81, the armature 91 is brought into contact with the core 83 against the force of the spring 95, so that the projection 90 of the lever 85 can abut the cam projection 56 or 57 as shown in FIGS. 10A and 10D. When a current is supplied to the coils 84, the armature 91 is separated from the core 83 by the force of the spring 95, so that the projection 90 is positioned so as not to abut the cam projections 56 and 57 as shown in FIGS. 10B and 12A.

As shown in FIG. 4, a subcontrolling lever 96 has a shape of bellcrank, and is swingably or rotatably secured by a pin 102 to the second ar 87 of the main controlling lever 85 near a distal end thereof. The lever 96 comprises a first long arm 97 extending substantially in the transverse direction in FIG. 1; a second short arm 98 extending substantially in the obliquely rear direction in FIG. 1; and a pair of small projections 99, which extend from the left side of the lever 96 in FIG. 1. The pair of projections 99 abut the folded portion 95d of the spring 95 as shown in FIG. 1.

Figure 7:
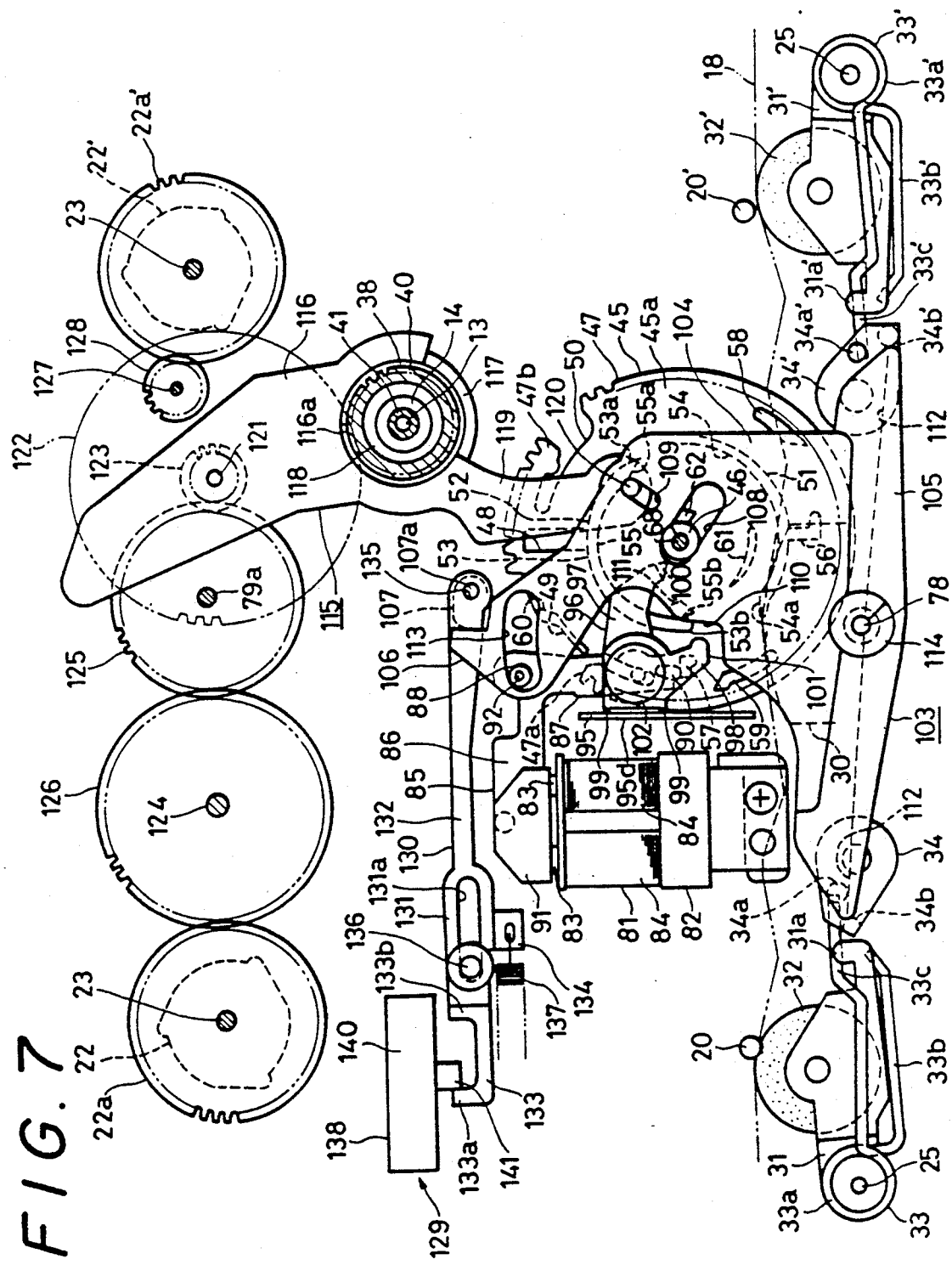
FIG. 7 is a bottom view with portions removed for purpose of illustration of the tape transport apparatus of FIG. 1 while in normal play mode.
Figure 8:
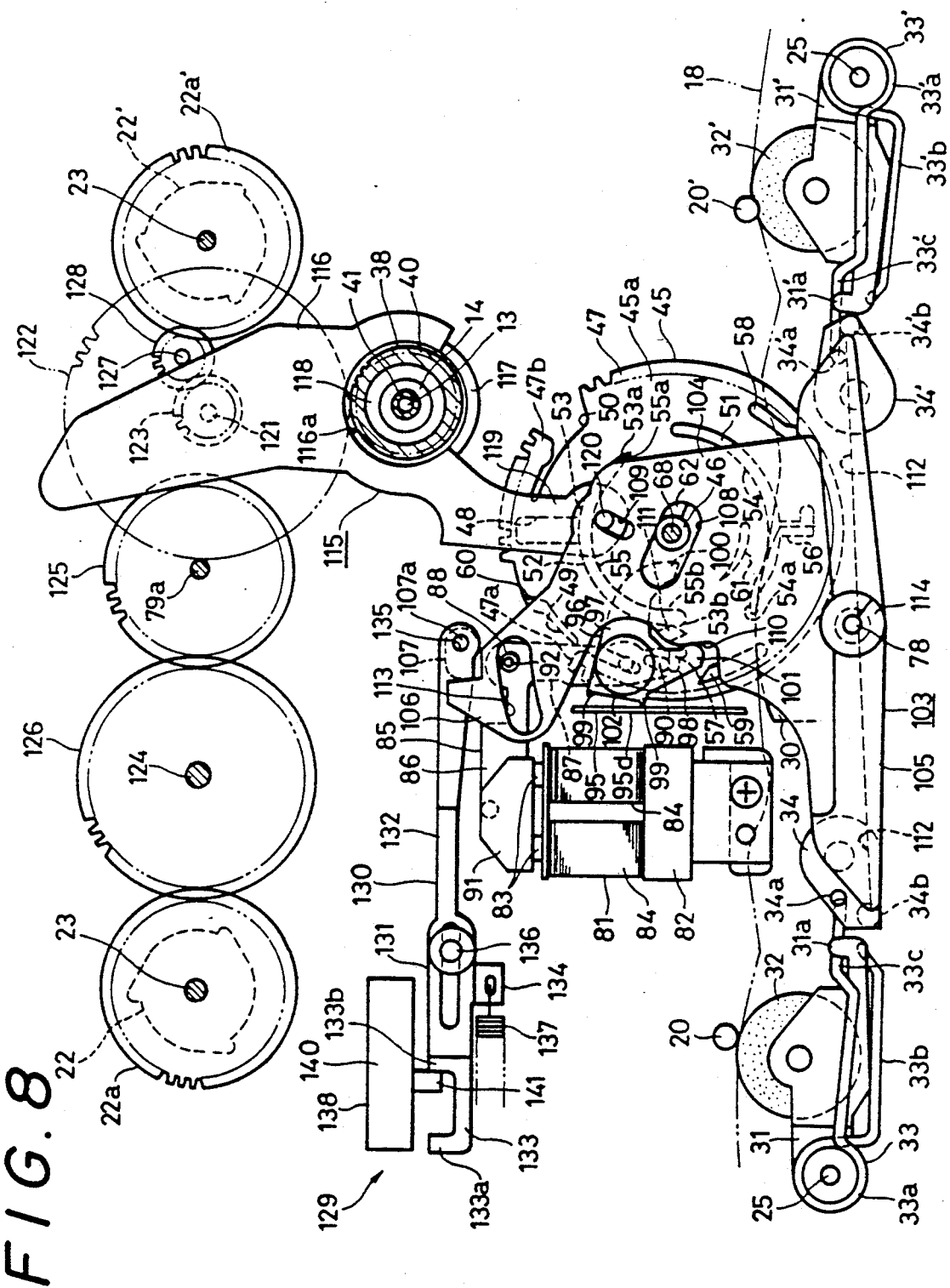
FIG. 8 is a bottom view with portions removed for purpose of illustration of the tape transport apparatus of FIG. 1 while in reverse play mode.
Figure 10C:
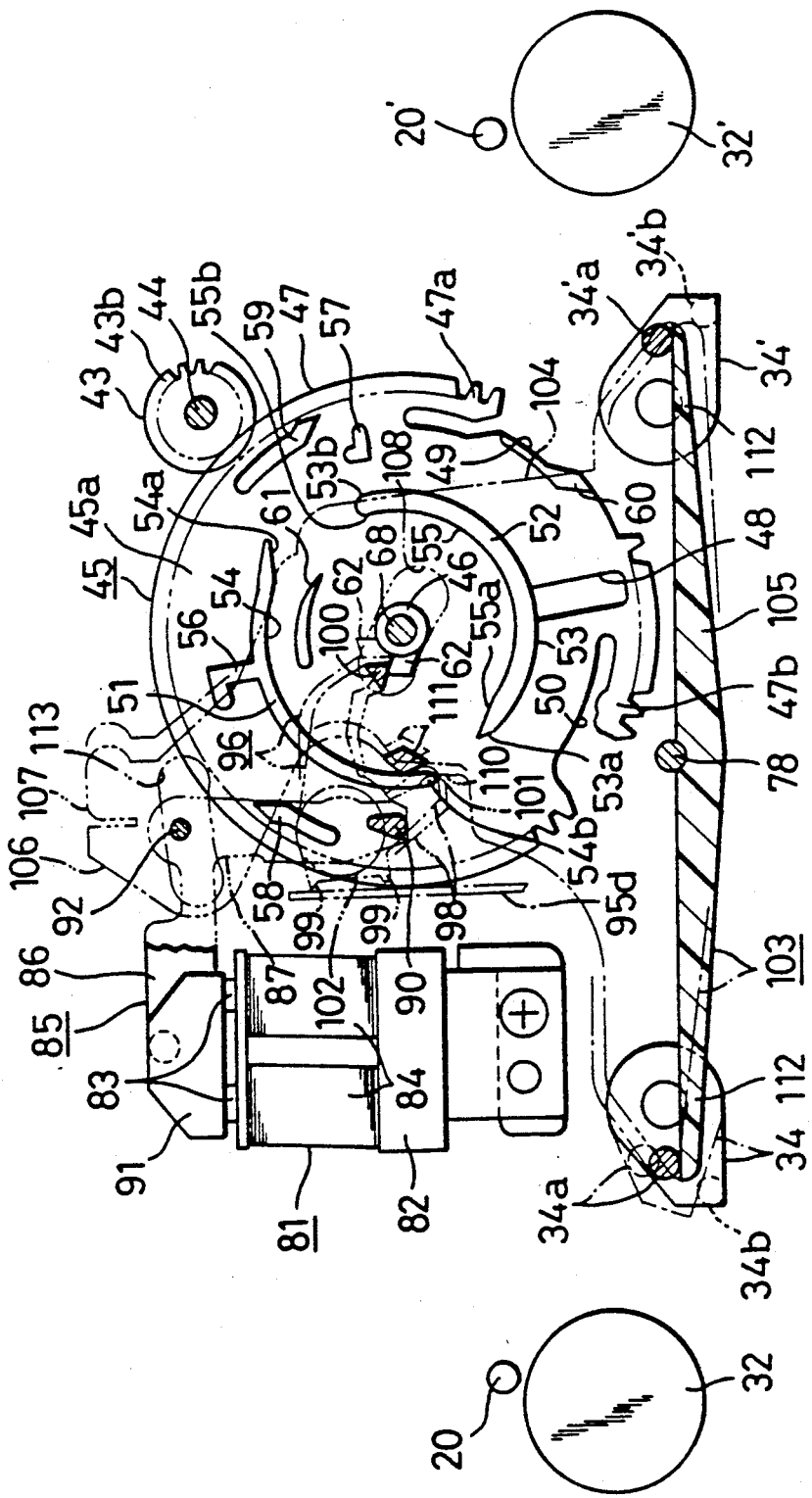
Figure 10D:
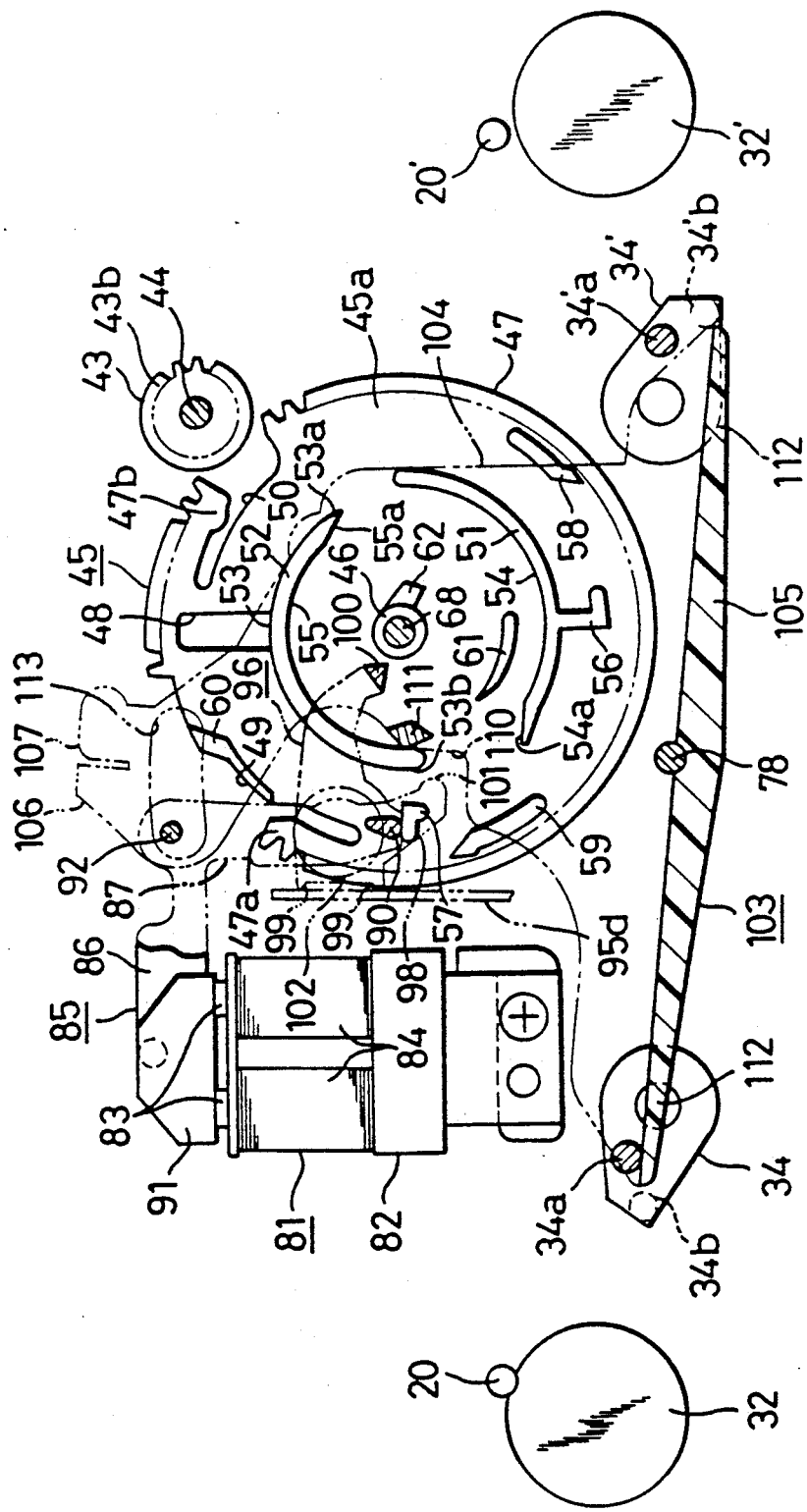

As shown in FIG. 7, the first arm 97 of the subcontrolling lever 96 crookedly extends, and has a triangular projection 100 at the distal end thereof so as to be capable of abutting against the cam projection 62 of the cam 45 as shown in FIG. 10C. A distal end 101 of the second arm 98 is formed of a small circular shape as shown in FIG. 7 so as to be capable of abutting against an edge 110 of the mode selecting lever 103 as shown in FIG. 8.

Thus, the subcontrolling lever 96 is moved together with the main controlling lever 85 except when the triangular projection 100 or the distal end 101 of the subcontrolling lever 96 is pushed against the force of the spring 95, because the pair of projections 99 of the subcontrolling lever 96 have been pushed by the folded portion 95d of the spring 95.

ROTATION OF THE CAM MEANS 45

In the stop mode of the apparatus 1 shown in FIG. 1, the cam means 45 is located in the first nonrotatable position, and the small gear 43b faces the first toothless portion 49 of the gear 47. At that time, the cam projection 56, which is arranged in the lower face 45a of the cam means 45 and horizontally extending in FIG. 10A, abuts against the projection 90 of the main controlling lever 85 as the armature 91 of the lever 85 is attracted to the core 83 of the electromagnet 81, so that the cam means 45 is prevented from rotating in its clockwise direction in FIG. 10A.

Next, in the upper face 45b of the cam means 45, the first pressed cam face 64a which is upwards convex in FIG. 9A, abuts against a front edge 70a of the opening 70. The front edge 70a functions as the follower of the cam projection 63, because the slider 69 has been urged downwards in FIG. 9A by the force of the spring 80. At that time, as the cam face 64a abuts against the front edge 70a only at its protruding part which is located at the right of the shaft 68, so the cam means 45 is going to rotate in the clockwise direction in FIG. 9A, but this rotation is obstructed by the contact between the projections 56 and 90. It is also noted that the projection 27b of the head holder 26 is located very near a rear edge 71a of the rectangular opening 71 of the slider 69 as shown in FIG. 9A.

When a current is supplied to the coils 84 of the electromagnet 81, the armature 91 is separated from the core 83 of the electromagnet 81 as shown in FIG. 10B, and the main controlling lever 85 is swung in its clockwise direction, so that the projection 90 of the lever 85 is disengaged from the cam projection 56 of the cam means 45. As the result, the cam means 45 begins to rotate in its clockwise direction in FIG. 10B due to contact between the protruding part of the cam face 64a and the front edge 70a of the opening 70 and due to force of the spring 80, so that the resiliently deformable portion 47a of the segment gear 47 is engaged with the small gear 43b, and the cam means 45 is successively rotated in its clockwise direction in FIG. 10B by the motor 35 which is in the normal rotation.

Figure 9B:
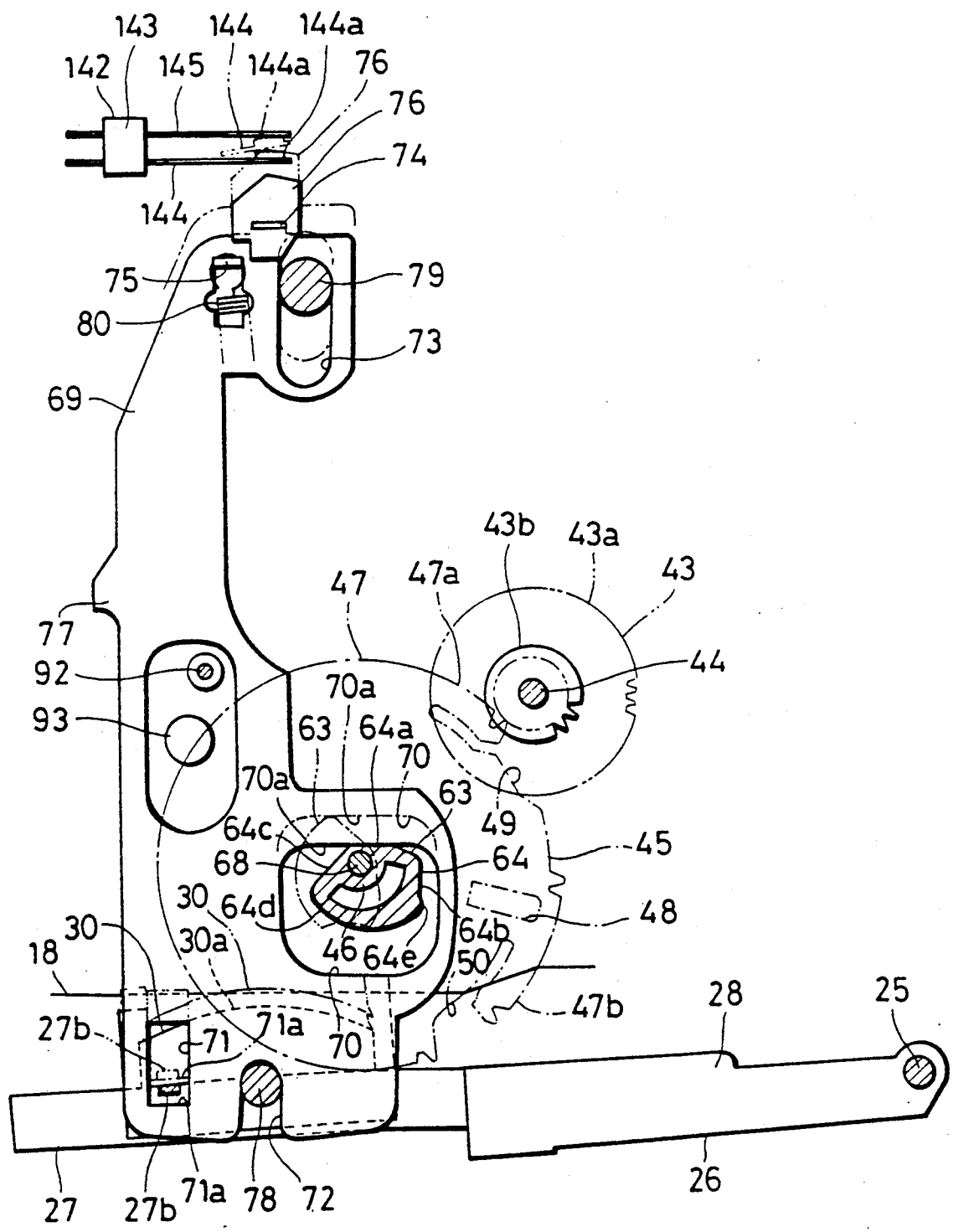
Figure 9C:
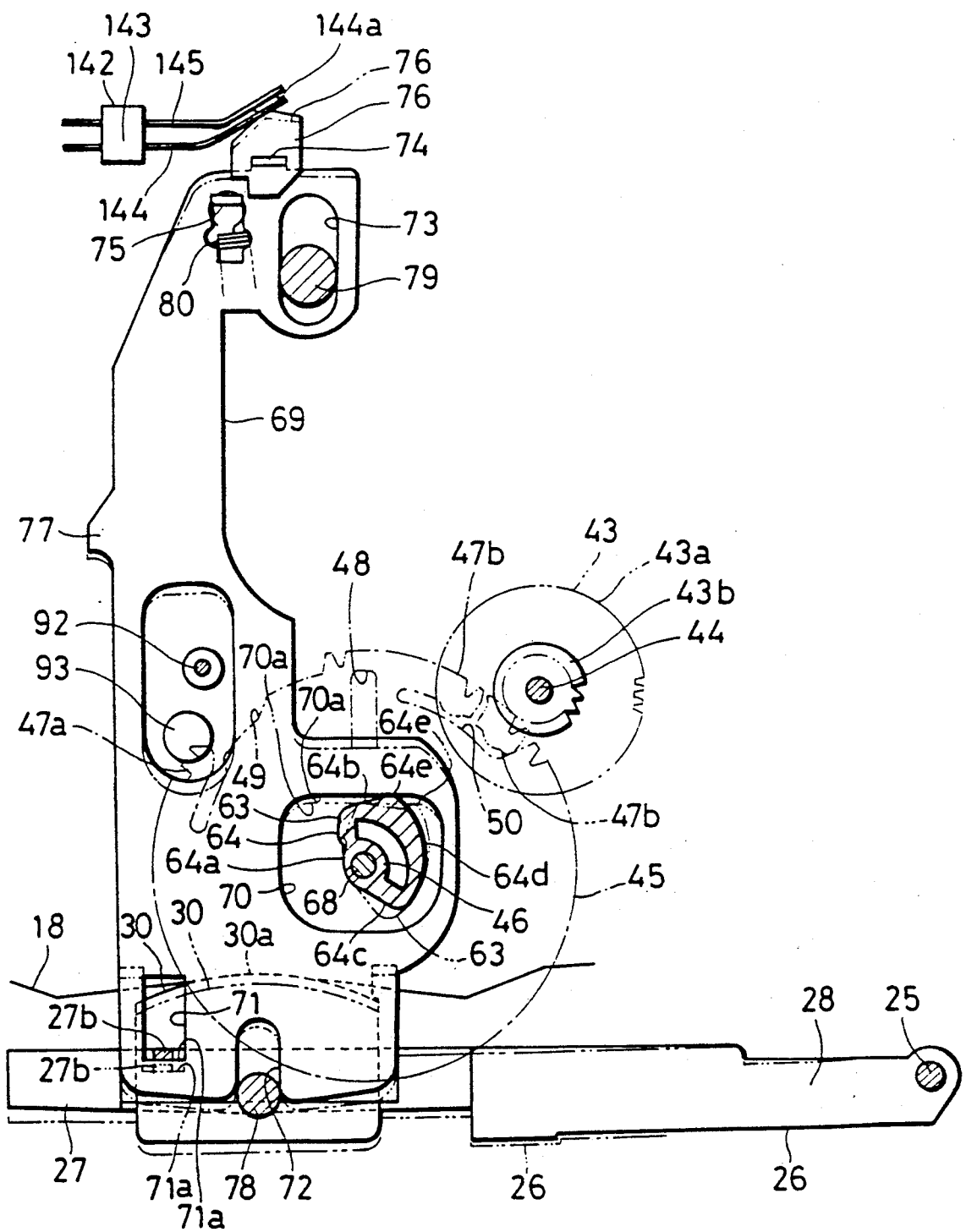

While the cam means 45 is rotated from the first nonrotatable position shown in FIG. 9A to the second nonrotatable position shown in FIG. 9C, the slider 69 is longitudinally moved by the rotated cam projection 63. That is, while the cam projection 63 is rotated from the position shown in FIG. 9A to the position shown in FIG. 9B, the slider 69 is moved a little downwards as indicated in solid lines in FIG. 9B by the force of the spring 80. Next, while the first pressing cam face 64c abuts against the follower 70a, the slider 69 is moved from the position indicated in solid lines to the position indicated in two-dot chain lines in FIG. 9B, and, thus, the rear edge 71a of the opening 71 pushes the projection 27b of the head holder 26 so that the head holder 26 may be swung in its clockwise direction in FIG. 9B on the shaft 25. Then, while the second pressing cam face 64d abuts against the follower 70a, the slider 69 is moved from the position indicated in two-dot chain lines in FIG. 9B in its clockwise direction, and when the rear end 64e of the second pressing cam face 64d abuts against the follower 70a, the slider 69 reaches its uppermost position (see FIG. 9C). Even though the small gear 43b is disengaged from the segment gear 47 due to existence of the second toothless portion 50, the cam means 45 is still rotated by the force of the spring 80, because the rear end 64e of the second pressing cam face 64d is located at the right of the shaft 68 as shown in FIG. 9C.

In the meanwhile, before the cam means 45 reaches the second nonrotatable position, the main controlling lever 85 is returned to the position shown in FIG. 10C (the detailed function of the lever 85 will be hereinafter described), so that the cam means 45 is stopped in the second nonrotatable position by the projection 90 abutting the cam projection 57 as shown in FIG. 10D which illustrates the play mode. At that time, the slider 69 is located in a position indicated in solid lines in FIG. 9C, and the head holder 26 is also located in the position indicated in solid lines in FIG. 9C so as to have the magnetic tape 18 brought into contact with the magnetic head 30.

Next, when a current is again supplied to the coils 84 of the electromagnet 81, the armature 91 is separated from the core 83 of the electromagnet 81, and the main controlling lever 85 is again swung in its clockwise direction, so that the projection 90 abutting the cam projection 57 of the cam means 45 as shown in FIG. 10D is disengaged. As the result, the cam means 45 begins to rotate in its clockwise direction due to force of the spring 80 and due to contact between the rear end 64e of the second pressing cam face 64d and the front edge 70a of the opening 70, which is indicated in solid lines in FIG. 9C.

As the cam means 45 and slider 69 come to a position indicated in two-dot chain lines in FIG. 9C, the resiliently deformable portion 47b of the gear 47 is engaged with the small gear 43b, so that the cam means 45 is successively rotated in its clockwise direction by the motor 35 which is in the normal rotation. While the cam means 45 is rotated as described above, the slider 69 is moved downwards in FIG. 9C by the force of the spring 80 because the distance between the center of rotation 68 and the cam faces 64b and 64a of the cam projection 63 decreases, and the armature 91 is again attracted to the core 83 of the electromagnet 81 to swing the main controlling lever 85 in its counterclockwise direction, and thereby, the projection 90 is abutted the cam projection 56 of the cam means 45 (the function of the main controlling lever 85 will be hereinafter described).

When the small gear 43b is disengaged from the partially toothless gear 47, the protruding part of the first pressed cam face 64a comes into contact with the front edge 70a, so that the cam means 45 is successively rotated by the force of the spring 80, and the cam means 45 is stopped by the projection 90 to return to the nonrotatable position. It is to be noted that the head holder 26 returns to the position shown in FIG. 9A by the force of the spring 29 as the slider 69 is moved back to the position shown in FIG. 9A.

MODE SELECTING LEVER 103

As shown in FIG. 4, the mode selecting lever 103 comprises a trapezoid-like base portion 104; a rear portion 105 which extends along the rear edge of the base portion 104 and is a little longer than the width of the base portion 104; an arm portion 106 which extends obliquely forwards at the left from the forward edge of the base portion 104; and an L-shaped connecting portion 107 which projects forwards from the distal end of the arm portion 106.

Figure 6:
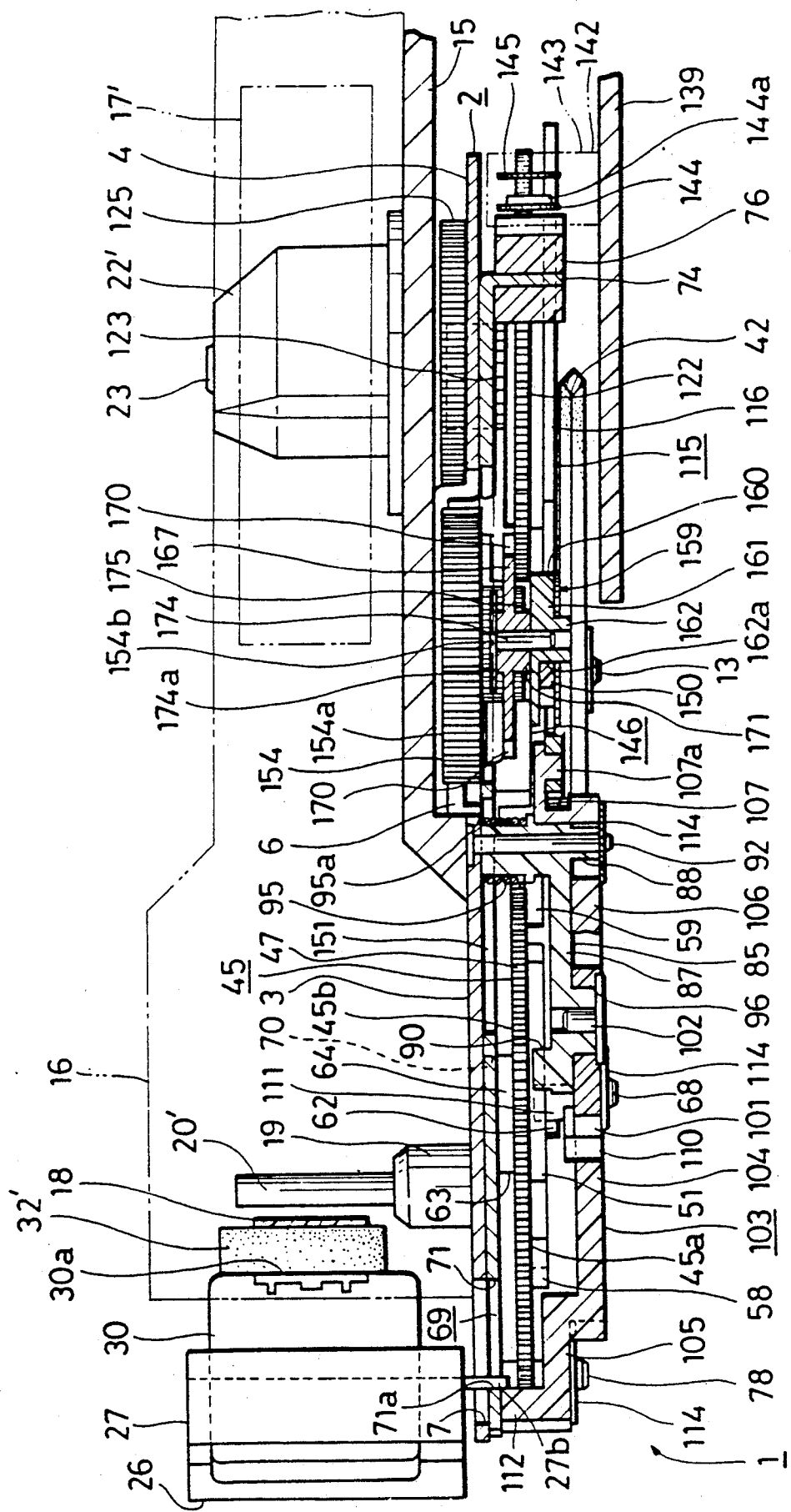
FIG. 6 is a cross sectional view on an enlarged scale taken along the line VI—VI on FIG. 1.

As shown in FIG. 6, the mode selecting lever 103 is situated at the lower side of the cam means 45 in such a manner that the cam means 45 extends over the base portion 104 of the lever 103. The lever 103 is mounted for horizontal rotation on the guide pin 78, which is inserted into a hole 105a which is provided substantially at the center of the rear portion 105. As previously stated, the guide pin 78 is fitted, as shown in FIG. 9A, into the notch 72 of the slider 69 to guide the slider 69. As shown in FIG. 7, the shafts 68 and 92 are loosely fitted into respective elongate holes 108 and 113 which are provided substantially at the center of the base portion 104 and at the distal end of the arm portion 106. Further, as previously stated, the shafts 68 and 92 are the respective pivots of the cam means 45 and the main controlling lever 85. It is also noted that a snap ring 114 is secured to each distal end of the guide pin 78 and the shafts 68 and 92 as shown in FIG. 6.

A pin 120, which projects from a lever 115 (hereinafter described), is fitted, as shown in FIG. 7, into an elongate hole 109, which is provided in front of the elongate hole 108. An L-shaped notch 110 formed on the left side of the lever 103 in FIG. 7 can come into contact with the distal end 101 of the second arm 98 of the subcontrolling lever 96. A rhombus-shaped projection 111 provided near the notch 110 as shown in FIG. 7 can come into contact with the cam projections 52 and 54 of the cam 45. A low wall or flange 112, which is provided along the rear edge of the rear portion 105 of the lever 103, can push either of the levers 34 or 34', for example, as shown in FIG. 10C. The lever 103 is always urged in its counterclockwise direction, as seen in FIG. 7, because the lever 103 is connected to a switch operating lever 130 by a pin 107a which projects from the connecting portion 107 of the lever 103, and the lever 130 is urged to the left. The constitution and function of the switch operating lever 130 will be hereinafter described.

PLAY MODE LEVER 115

As shown in FIG. 4, a play mode lever 115 comprises a base portion 116 of a dog-legged shape; an annular portion 116a disposed at the rear edge of the base portion 116 and has a partial arcuate wall 117 which extends upwards therefrom; and an arm portion 119 extending rearwards from the left end of the base portion 116. A cylindrical bearing 118 is arranged in coaxial relation to the annular portion 116a, and is fixed to the upper end of the partial arcuate wall 117 at the upper end thereof. The hollow shaft 14, which projects from the chassis 2 is fitted into the cylindrical bearing 118 as shown in FIG. 7, so that the play mode lever 115 can horizontally swing on the shaft 14. As previously stated, the pin 120, which projects from the arm portion 119 of the play mode lever 115, is fitted into the elongate hole 109 of the mode selecting lever 103, so that the play mode lever 115 is swung, as the mode selecting lever 103 is made to swing.

A shaft 121, which projects upward substantially from the center of the base portion 116 of the lever 115, is fitted into a large gear 122 and a small gear 123 in turn from the proximal end thereof. As shown in FIG. 6, a friction transmission device, which comprises friction plates and a compression spring (not shown), is sandwiched between the gears 122 and 123 so as to transmit the rotation of the large gear 122 to the small gear 123. The large gear 122 is meshed with the spur gear 40 of the rotating member 38 as shown in FIG. 1, so that when the motor 35 is driven in the normal direction, the large gear 122 is rotated in the counterclockwise direction in FIG. 1.

In FIG. 7, intermediate gears 125, 126 and 128 rotate on respective shafts 79a, 124 and 127. The shafts 124 and 127 project from the chassis 2 as shown FIG. 4, and the shaft 79a is a portion of the guide pin 79 which guides the slider 69 as shown in FIG. 9A. A portion of the guide pin 79 extends upwards through the chassis 2. The gear 125, which is meshed with the gears 123 and 126, has substantially the same diameter as that of the gear 22a; the gear 126, which is meshed with the gears 22a and 125, has a little larger diameter than that of the gear 125; and the gear 128, which is meshed with the gears 22'a and 123 has substantially the same diameter as that of the gear 123. It is noted that the gear 123, which is secured to the play mode lever 115, partially protrudes from the elongate opening 9 of the chassis 2 as shown in FIG. 1.

Thus, in the normal play mode shown in FIG. 7, the N-reel-base 22 is rotated in its clockwise direction, that is, in the direction for taking up the magnetic tape 18 due to rotation of the gear 123 which is rotated in a counterclockwise direction by the motor 35. The motor 35 is driven in its normal direction. Next, in the reverse play mode shown in FIG. 8, the R-reel-base 22' is rotated in the counterclockwise direction, that is, in the direction for taking up the magnetic tape 18 by the gear 123 rotated in the counterclockwise direction in FIG. 8.

STOP MODE

In the stop mode shown in FIGS. 1 and 10A, the armature 91 of the main controlling lever 85 comes into contact with the core 83 of the electromagnet 81, and the cam means 45 is located in the first nonrotatable position. Further, the rhombus-shaped projection 111 of the mode selecting lever 103 comes into contact with the inner periphery or surface 54 of the cam projection 51 as shown in FIG. 10A. As previously stated, the cam projection 51 has the shape of circular arc around the center of the cam means 45, so that while the projection 111 is in contact with the inner periphery 54 except the forward end 54a of the cam projection 51, the mode selecting lever 103 does not swing and is kept in its neutral position shown in FIGS. 1 and 10A, Where the wall 112 of the lever 103 does not push either of the levers 34 and 34' for moving the respective pinch rollers 32 and 32'. When the mode selecting lever 103 is in its neutral position, the play mode lever 115 is also kept in its neutral position as shown in FIG. 1, so that the gear 123 is not meshed with either of the gears 125 or 128. It is noted that the distal end 101 of the second arm 98 of the subcontrolling lever 96 is adjacent to the edge 110 of the mode selecting lever 103, and the triangular projection 100 of the first arm 97 of the subcontrolling lever 96 is adjacent to the upper left of the boss 46 of the cam means 45 as shown in FIG. 1.

NORMAL PLAY MODE

As soon as a current is supplied to the coils 84 of the electromagnet 81 when the apparatus 1 is in the stop mode, the main controlling lever 85 swings in its clockwise direction as shown in FIG. 10B, so that the cam means 45 is unlocked and is rotated to a position where the segment gear 47 begins to mesh with the gear 43b, as the protruding part of the cam projection 63 is pushed by the slider 69. Then, the cam means 45 is successively rotated by the motor 35 which is driven in the normal direction.

When the cam means 45 turns substantially through a central angle of 40°, the forward end of the cam projection 58 indicated in chain-dotted lines in FIG. 10B abuts against the projection 90 of the main controlling lever 85, and makes the main controlling lever 85 swing in its counterclockwise direction so as to have the armature 91 attracted to the core 83 of the electromagnet 81.

After the cam means 45 turns through a central angle of a little over 80° from the beginning of its rotation, the cam projection 62 of the cam means 45 begins to abut against the triangular projection 100 of the subcontrolling lever 96 as indicated in solid lines in FIG. 10C, and the rhombus-shaped projection 111 of the mode selecting lever 103 reaches such a position as to abut the rear end 54b of the inner periphery 54 of the cam projection 51 as indicated in solid lines in FIG. 10C.

After the cam means 45 turns substantially through a central angle of 90° from the beginning of its rotation, the projection 111 of the mode selecting lever 103 becomes free from the cam projection 51 of the cam means 45, but the lever 103 does not turns in the counterclockwise direction, even though the lever 103 is urged in a left direction (FIG. 7) by the force of the spring 137 through the switch operating bar 130. Because the cam projection 62 of the cam means 45 pushes the triangular projection 100 of the subcontrolling lever 96 so as to make the lever 96 swing in its counterclockwise direction as the cam means 45 successively turns, the distal end 101 of the second arm 98 of the subcontrolling lever 96 abuts the edge 110 of the mode selecting lever 103, and prevents the lever 103 from swinging in the counterclockwise direction.

After the cam means 45 turns substantially through a central angle of 60° after the cam projection 62 of the cam means 45 begins to abut the triangular projection 100 of the subcontrolling lever 96, the triangular projection 100 becomes free from the cam projection 62 as indicated in chain-dotted lines in FIG. 10C, so that the subcontrolling lever 96 returns to its initial position by the force of the folded portion 95d of the spring 95. As a results of this, the mode selecting lever 103 swings in the counterclockwise direction due to the force of the spring 137. Thus, the rhombus-shaped projection 111 of the mode selecting lever 103, which has reached, until that time, such a position as to face the forward end 55a of the inner periphery 55 of the cam projection 52, comes in contact with the forward end 55a.

Since the outer periphery 53 of the cam projection 52 is formed substantially on the same radius as the inner periphery 54 of the cam projection 51 as previously stated, the radius of the inner periphery 55 of the cam projection 52 is a little smaller than that of the inner periphery 54 of the cam projection 51. Thus, in the normal play mode shown in FIGS. 7 and 10D, in which the projection 111 of the mode selecting lever 103 is in contact with the inner periphery 55 of the cam projection 52 except at the forward end 55a thereof, the mode selecting lever 103 leans to the right with respect to its neutral position.

When the cam means 45 turns substantially through the central angle of 130° after the projection 111 of the mode selecting lever 103 begins to abut the cam projection 52 of the cam means 45, the cam means 45 reaches the second nonrotatable position, and the projection 111 of the lever 103 is in contact with the rear end 55b of the inner periphery 55 of the cam projection 52 as shown in FIG. 10D.

In the normal play mode, the play mode lever 115 is rotated in a counterclockwise direction, as shown in FIG. 7 by the mode selecting lever 103. A left portion of the wall 112 of the lever 103 pushes the downward projection 34a of the lever 34 so as to make the lever 34 swing in its clockwise direction, so that the left pinch roller 32 moved by the spring 33 and lever 31, is pressed against the left capstan 20. Also, the magnetic head 30 is brought into contact with the magnetic tape 18 as previously stated.

Thus, the magnetic tape 18 sandwiched between the capstan 20 and pinch roller 32 runs in its normal direction, and is taken up by the reel mounted on the N-reel-base 22. The normal play mode is obtained when a current is supplied once to the coils 84 of the electromagnet 81 and the apparatus was in the stop mode.

REVERSE PLAY MODE

The early stage of obtaining the reverse play mode is the same as that of obtaining the normal play mode, but it is different that a current is again supplied to the electromagnet 81 after the cam means 45 is rotated in a predetermined arc. That is, as soon as the cam projection 62 of the cam means 45 begins to push the triangular projection 100 of the subcontrolling lever 96, the current is supplied to the electromagnet 81 so as to release the mode selecting lever 103 from contact with the distal end 101 of the second arm 98 of the subcontrolling lever 96.

Figure 11A:
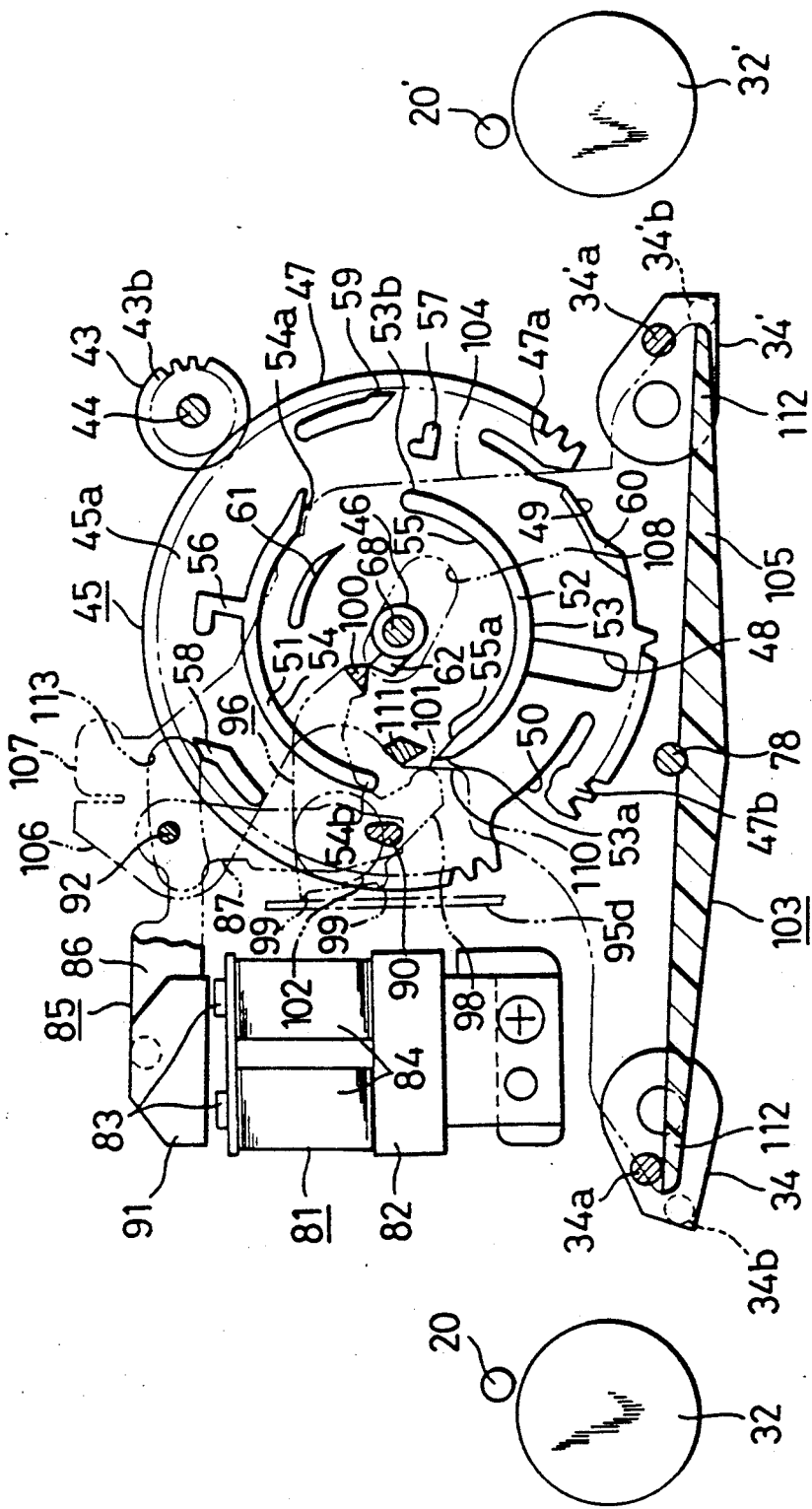

At that time, the rhombus-shaped projection 111 of the mode selecting lever 103 is situated between the rear end 54b of the cam projection 51 and the forward end 53a of the cam projection 52 as shown in FIG. 11A. Thus, the lever 103 leans to the left as shown in FIG. 11B with respect to its neutral position, until the right portion of the wall 112 of the lever 103, which is urged to the left in FIG. 8 by the force of the spring 137, pushes the downward projection 34'a of the lever 34' so as to have the right pinch-roller 32', lightly pressed against the right capstan 20'.

Right thereafter, the rhombus-shaped projection 111 of the mode selecting lever 103 comes into contact with the forward end 53a of the outer periphery 53 of the cam projection 52, and the lever 103 is moved more to the left. The projection 111 is then brought into contact with the outer periphery 53 of the cam projection 52 except the forward end 53a as shown in FIGS. 8 and 11C so that the lever 103 can not swing any more.

When the cam means 45 has turned through a central angle of 205° from the beginning of its rotation, the third return cam projection 60 of the cam means 45 is pressed against the projection 90 of the main controlling lever 85, so that the main controlling lever 85 returns to the position where the armature 91 is brought into contact with the core 83 of the electromagnet 81. At that time, the distal end 101 of the second arm 98 of the subcontrolling lever 96 abuts against the edge 110 of the mode selecting lever 103, and the subcontrolling lever 96 is swung a little in its clockwise direction.

In the reverse play mode, the rhombus-shaped projection 111 of the mode selecting lever 103 is in contact with the rear end 53b of the outer periphery 53 of the cam projection 52 as shown in FIG. 11C, and the play mode lever 115 is rotated in a clockwise direction, as shown in FIG. 8 by the mode selecting lever 103. The right portion of the wall of the lever 103 pushes the downward projection 34'a of the lever 34' so as to make the lever 34' swing in its counterclockwise direction, so that the right pinch roller 32', which is moved by the spring 33' and lever 31' is pressed against the right capstan 20'. Thus, the magnetic tape 18 sandwiched between the capstan 20' and pinch roller 32' runs in its reverse direction, and is taken up by the reel mounted on the R-reel-base 22'. That is, the reverse play mode is obtained when a current is supplied twice to the electromagnet 81 and the apparatus 1 of which is in the stop mode.

RETURN FROM PLAY MODE TO STOP MODE

As soon as a current is supplied to the electromagnet 81 when the apparatus 1 is in the play mode, the main controlling lever 85 shown in FIGS. 7 and 8 is swung in its clockwise direction to remove projection 90 from engagement with projection 57, and the unlocked cam means 45 begins to rotate in its clockwise direction by the force of the spring 80 acting through the slider 69, until the gear 47b of the cam means 45 is meshed with the gear 43b, then the cam means 45 is successively rotated.

Substantially at the same time as the gear 47b meshed with the gear 43b, the second return cam 59 abuts to push the projection 90 of the main controlling lever 85 radially inward, for example, as shown in FIG. 12A (which illustrates a return from the normal play mode). Thus, the main controlling lever 85 returns to the position where the armature 91 of the lever 85 is attracted to the electromagnet 81.

Right thereafter, the rhombus-shaped projection 111 of the mode selecting lever 103 becomes free from the cam projection 52 of the cam means 45. Therefore, when the apparatus 1 is in process of returning from the normal play mode shown in FIG. 7, the lever 103 is swung in its counterclockwise direction by the force of the springs 33 and 137, and when the apparatus 1 is in process of returning from the reverse play mode shown in FIG. 8, the lever 103 is swung in its clockwise direction only by the force of the spring 33'.

Figure 12B:
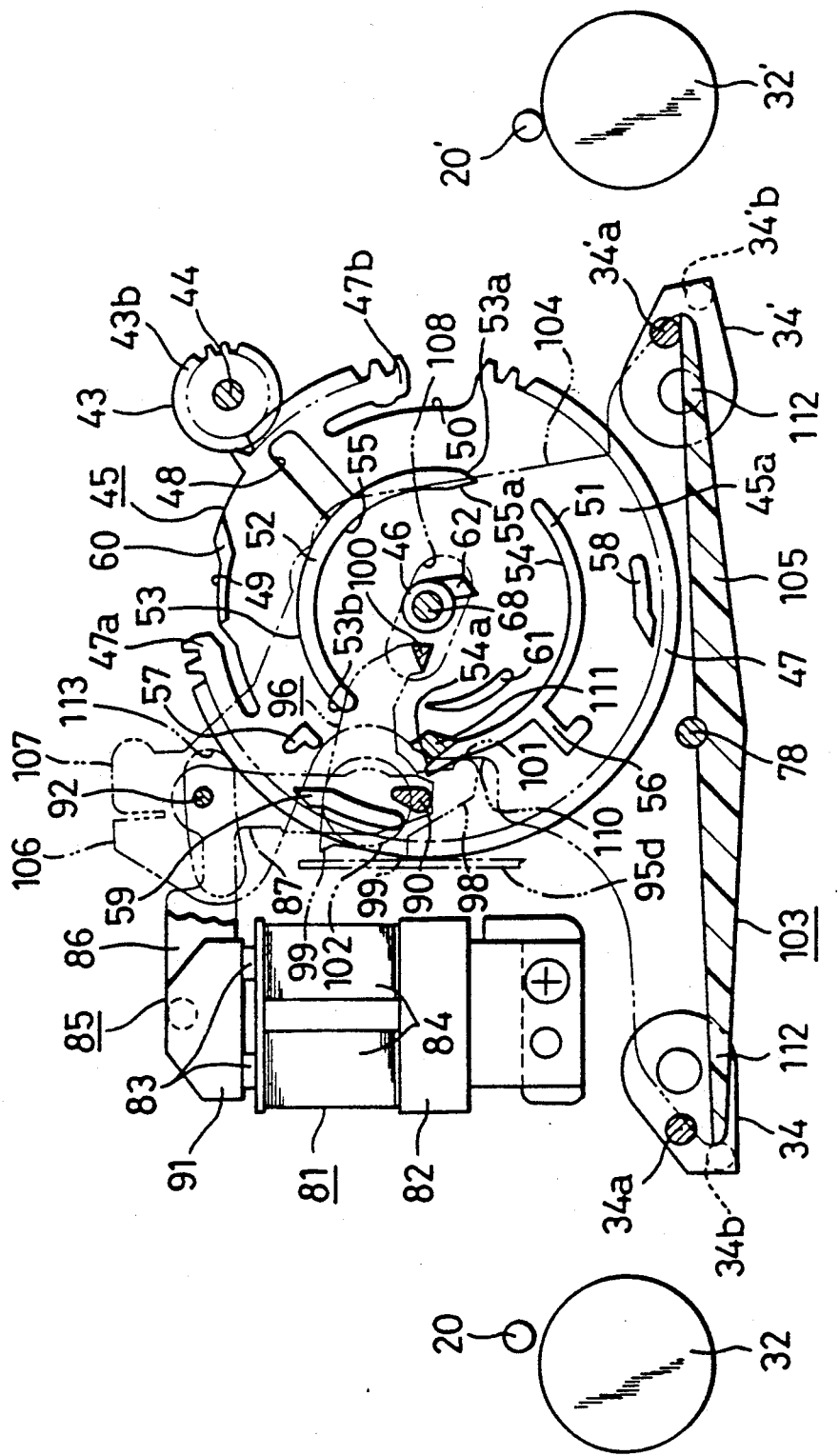

At that time, the distal end 101 of the second arm 98 of the subcontrolling lever 96 abuts the edge 110 of the mode selecting lever 103, so that the lever 96 is swung in its clockwise direction, and right thereafter, the rhombus-shaped projection 111 of the mode selecting lever 103 is brought into contact with the forward end 54a of the inner periphery 54 of the cam projection 51 as shown in FIG. 12B, and is then guided therefrom to the inner periphery 54 contiguous thereto.

Thus, the mode selecting lever 103 is returned to its neutral position, and the cam means 45 is stopped when returned to its first nonrotatable position.

As the mode selecting lever 103 is returned to its neutral position, the pinch roller 3 or 32' is separated from the capstan 20, 20', so that the magnetic tape 18 stops running. The slider 69 is returned to the position shown in FIG. 9A, so that the magnetic head 30 is separated from the magnetic tape 18, and the edge 110 of the mode selecting lever 103 is spaced away from the distal end 101 of the second arm 98 of the subcontrolling lever 96, so that the subcontrolling lever 96 is returned to the position shown in FIG. 1.

MODE RECORDING DEVICE

A mode recording device 129 shown in FIG. 1 comprises a slide switch 138 which determines whether the apparatus 1 is recording in the normal play mode and reverse play mode, and the switch operating bar 130 for operating the slide switch 138. The slide switch 138 has a rectangular switch box 140 and a switching bar 141, which is slidable between a first position indicated in solid lines and a second position indicated in two-dot chain lines in FIG. 1 along the longer side of the switch box 140.

The switching bar 141 clicks stopped in each of the two positions, and in those positions, different connections are obtained. Further, the slide switch 138 is secured to a printed circuit board 139 shown in FIG. 6. The printed circuit board 139 is arranged to be spaced away from and in parallel with the lower face of the chassis 2.

As shown in FIG. 4, the switch operating bar 130 comprises a frame portion 131 into which a guide pin 136 projecting from the left intermediate portion 5 of the chassis 2 in FIG. 4, is loosely fitted as shown in FIG. 1 and a connecting portion 132 which extends from one end of the frame portion 131. A distal end of the portion 132 is connected to the connecting portion 107 of the mode selecting lever 103 by a pin 107a projecting from the connecting portion 107 into a hole 135 provided at the distal end of the connecting portion 132 as shown in FIG. 7. The bar 130 has a switch operating portion 133, which extends from the other end of the frame portion 131 and has a first and a second projections at the respective ends thereof. In addition, the tension coiled spring 137 is stretched between spring stops or anchors 134 and 10 which are provided in the side of the frame 131 and in the chassis 2, respectively, so as to urge the switch operating bar 130 to the left in FIG. 1.

Thus, when the apparatus 1 is in the stop mode shown in FIG. 1, neither of the projections 133a nor 133b come into contact with the switching bar 141. When the apparatus 1 is in the normal play mode shown in FIG. 7, the first projection 133a of the switch operating portion 133 abuts the switching bar 141, and if the switching bar 141 is in its second position indicated in two-dot chain lines in FIG. 1, the projection 133a moves the switching bar 141 to the position shown in FIG. 7 and the solid line portion of FIG. 1. When the apparatus 1 is in the reverse play mode shown in FIG. 8, the second projection 133b of the switch operating portion 133 abuts the switching bar 141, and if the switching bar 141 is in its first position indicated in solid lines in FIG. 1, the projection 133b moves the switching bar 141 to the position shown in FIG. 8 and the chain line of FIG. 1. It is noted that as the fast mode and rewind mode of the apparatus 1 are conducted without rotating the cam means 45, so it does not occur that the switching bar 141 is moved at the time when the mode of the apparatus 1 is changed to either of those modes.

In the meanwhile, a switch 142 accommodated in a switch box 143 as shown in FIG. 1 has a pair of resilient strips 144 and 145 extending in parallel with each other, and a contact 144a is provided near the distal end of the resilient strip 144 so as to be able to make the contact 144a come into contact with the other resilient strip 145. The switch 142 is secured to the upper face of the printed circuit board 139 shown in FIG. 6 and is actuated by the distal end of the strip 144 being pushed by the switch pushing member 76 of the slider 69 as shown in FIG. 9B.

Substantially at the same time as the cam projection 62 of the rotated cam 45 abuts against the triangular projection 100 of the subcontrolling lever 96 as shown in FIG. 10C, the switch 142 is closed as indicated in two-dot chain lines in FIG. 9B, and a signal is given from the switch circuit to a system controller of the apparatus 1. Next, in response to the signal, the system controller will determine whether the switching bar 141 is in the first position or the second position and if the switching bar 141 is in the second position, a current is supplied to the electromagnet 81.

Thus, when the mode of the apparatus 1 is changed to the normal play mode shown in FIG. 7, the switching bar 141 of the slide switch 138 is located in its first position as shown in FIG. 7, so that a current is supplied only once to the electromagnet 81. However, when the mode of the apparatus 1 is changed to the reverse play mode shown in FIG. 8, the switching bar 141 is located in its second position as shown in FIG. 8, so that a current is supplied twice to the electromagnet 81. In addition, when the switch 142 is opened, the other signal is given from the switch circuit to the system controller, and the motor 35 is stopped at that signal.

FAST FORWARD/REWIND MODE SELECTING LEVER 146

Figure 13:
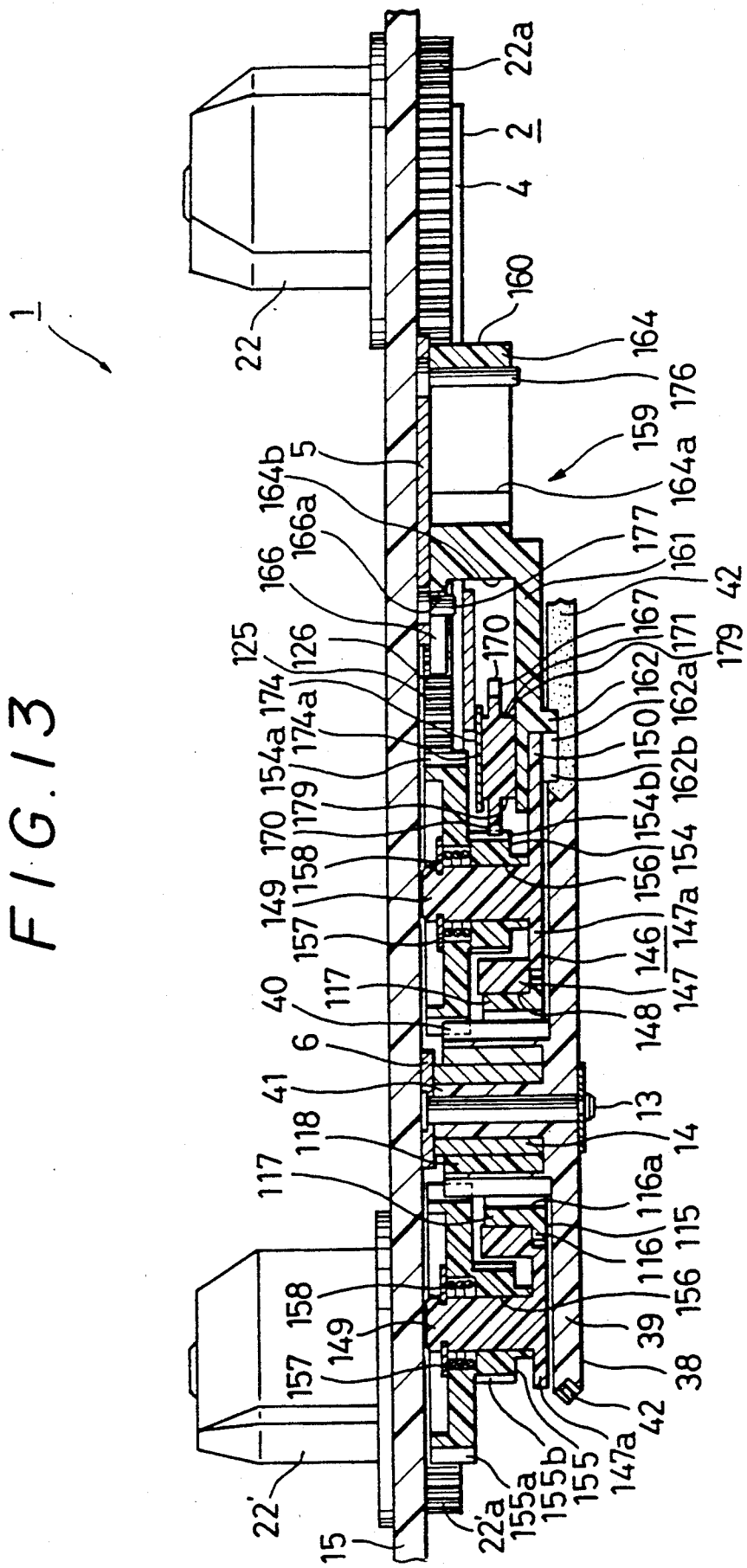
FIG. 13 is a cross sectional view on an enlarged scale, and taken along the line XIII—XIII of FIG. 1.

As shown in FIG. 4, the fast forward/rewind mode selecting lever (hereinafter designated as FF/REW mode selecting lever) 146 comprises a base portion 147 and a lever portion 151 extending rearwards from the base portion 147. At the center of the base portion 147, there is an annular opening 148 mounted on the partial arcuate wall 117 of the play mode lever 115 as shown in FIG. 13, so that the FF/REW mode selecting lever 146 can swing or rotate around the wall 117. On the right and left sides of the annular opening 148, there are discs 147a, from which shafts 149 of intermediate gears 154 and 155 (hereinafter described) project upwards as shown in FIG. 1, respectively. Further, as shown in FIG. 1, a cam follower 150 of a translation cam 160 (hereinafter described) projects from the left disc 147a of the lever 146.

Figure 17:
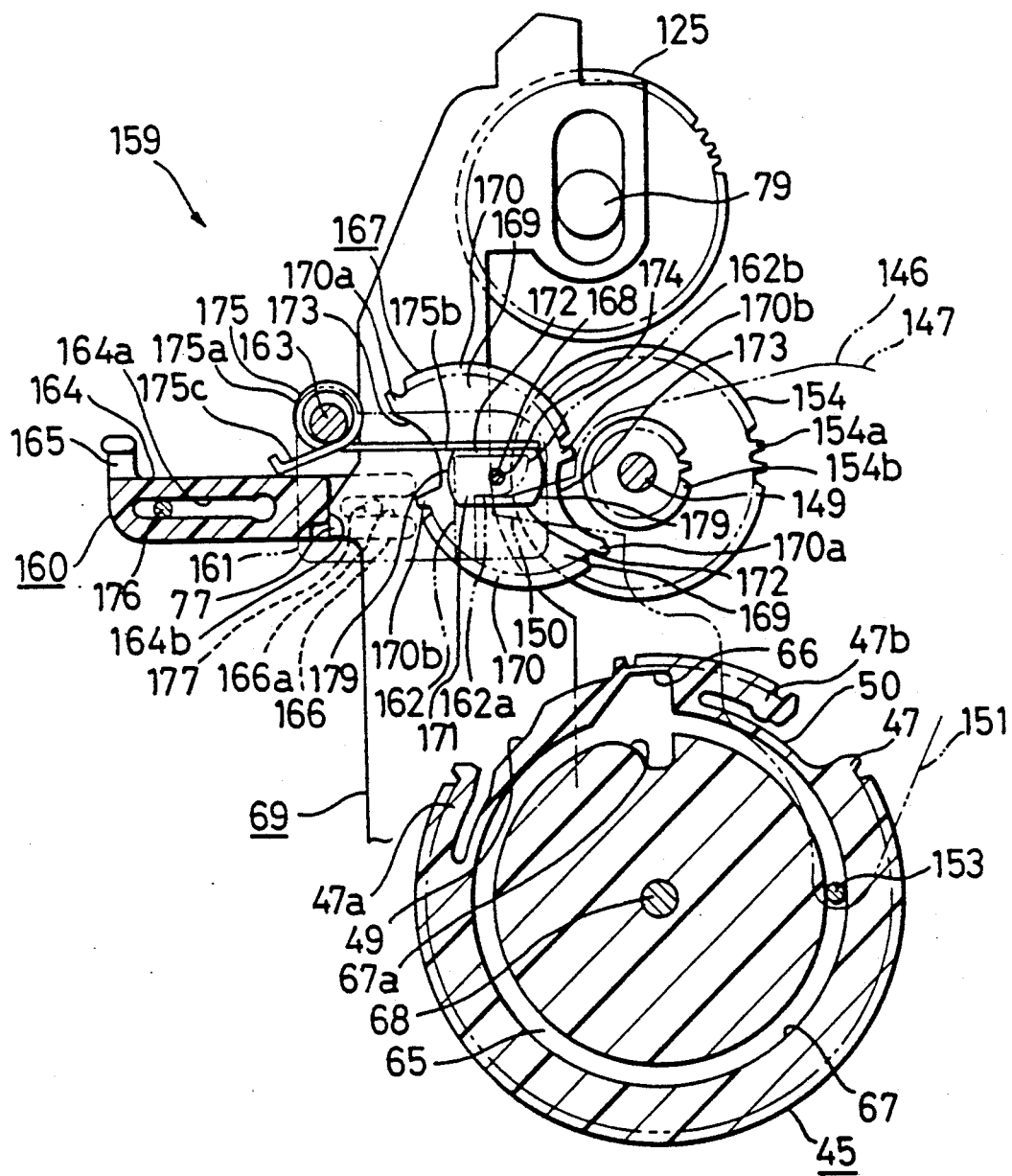
FIG. 17 is a plan view with portions broken away which illustrates a state of the fast forward/rewind mode selecting lever regulation mechanism of FIG. 14 at a time when the apparatus is in play mode.
Figure 18:
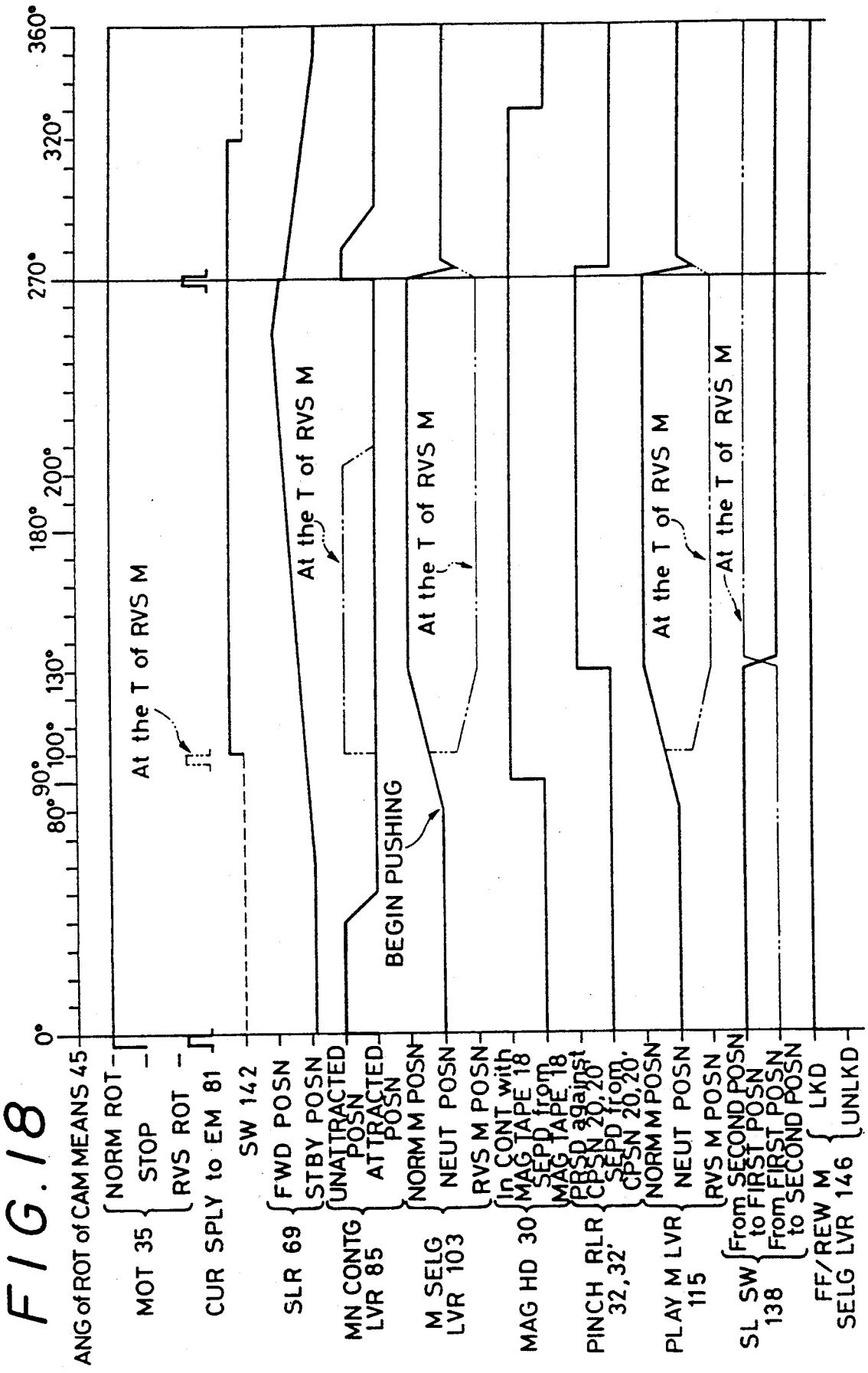
FIG. 18 is a diagram which shows relations between time and the motions of various parts that are incorporated in the tape transport apparatus embodying the invention.
Figure 19:
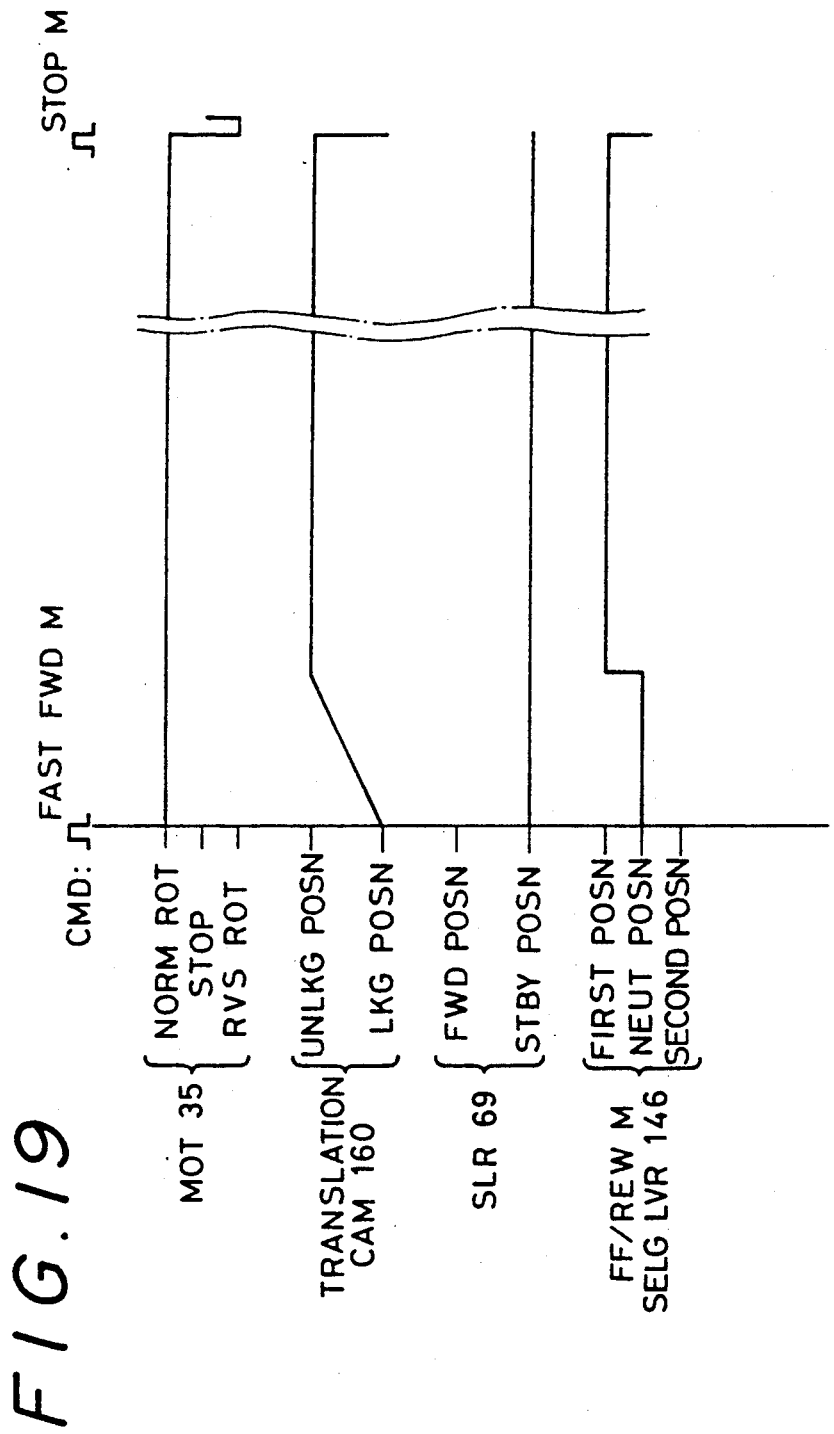
FIG. 19 is a diagram which shows relations between time and the motions of the respective parts of the fast forward/rewind mode selecting lever regulation mechanism of FIG. 14, while the mode of the apparatus is changed from the stop mode to the fast forward mode, and vice versa.
Figure 20:
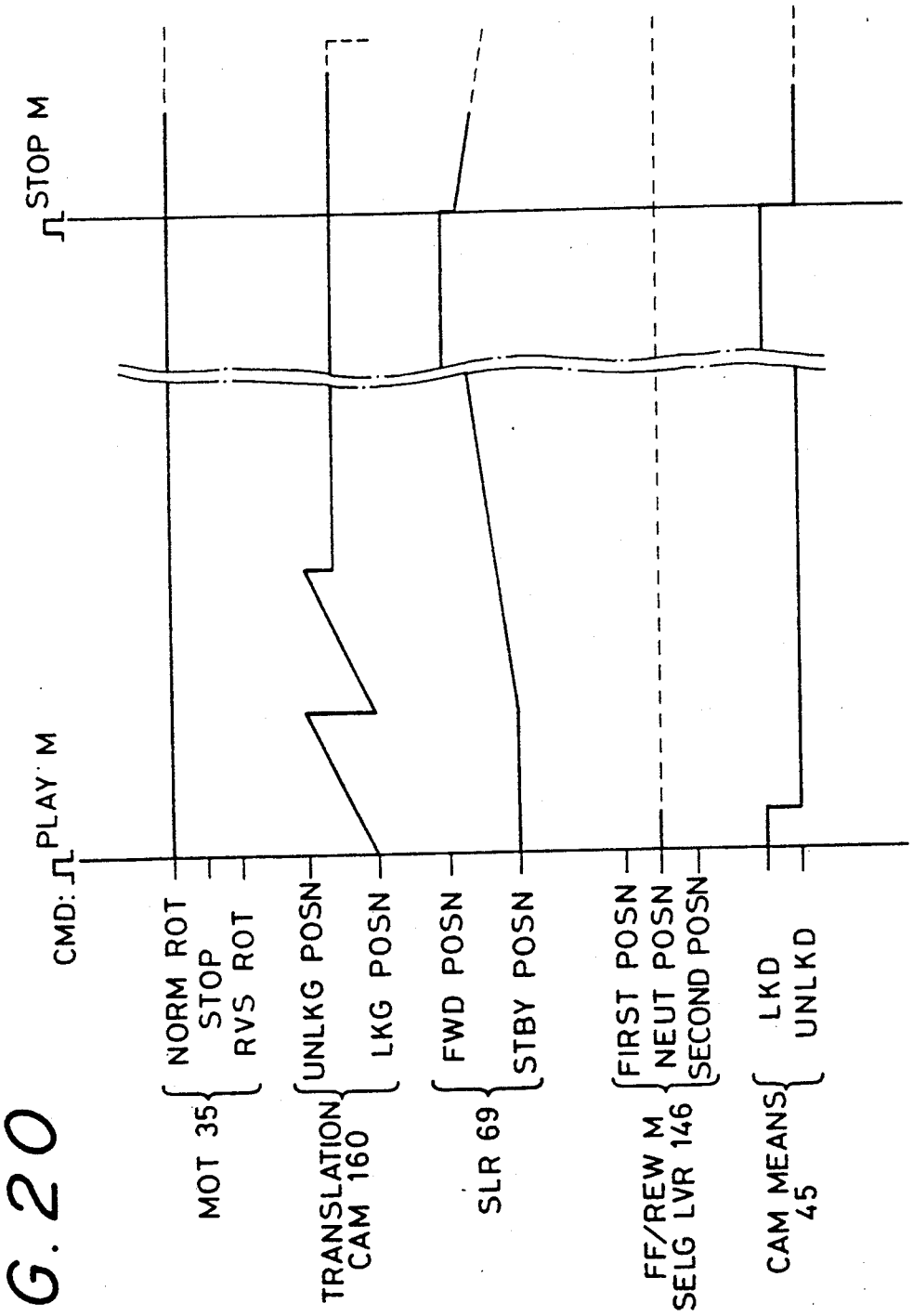
FIG. 20 is a diagram which shows relations between time and the motions of the respective parts of the fast forward/rewind mode selecting lever regulation mechanism of FIG. 14, while the mode of the apparatus is changed from the stop mode to the play mode, and vice versa.

Next, the projection 153 which projects downwards in FIG. 4 from the distal end of the lever portion 151 of the lever 14 is loosely fitted in the cam groove 65 of the cam means 45, for example, as shown in FIG. 17, and functions as the follower of the cam groove 65. In the lever portion 151 of the lever 146, there is provided a rectangular hole 152, into which the shaft 44 of the intermediate gear 43 is loosely fitted as shown in FIG. 1. It is noted that the FF/REW mode selecting lever 146 is positioned on the lower side of the chassis 2 as shown in FIG. 13.

As shown in FIG. 13, the intermediate gear 154, 155 consists of a large gear 154a, 155a and a small gear 154b, 155b, and the shaft 149 of the FF/REW mode selecting lever 146 is fitted in the central or axial hole 156 of the gear 154, 155 so as to make the gear 154, 155 rotate on the shaft 149. Next, each of the large gears 154a, 155a is substantially the same in diameter as the gear 22a, 22'a of the reel base 22, 22', and the small gear 154b, 155b are of a slightly smaller diameter than the disc 147a of the FF/REW mode selecting lever 146.

As shown in FIG. 13, the intermediate gear 154, 155 is pressed against the disc 147a of the lever 146 by the force of a compression spring 158 which is inserted between the upper face of each gear 154, 155 and a spring bearing 157 secured to the shaft 149 of the lever 146 so as to cause a pertinent friction between each gear 154, 155 and the disc 147a. Next, as shown in FIG. 1, the large gears 154a and 155a of the intermediate gears 154 and 155, which have been always meshed with the gear 40 of the rotating member 38, face the intermediate gear 125 and the gear 22'a of the R-reel-base 22', respectively.

The friction is caused, as mentioned above, between the gear 154, 155 and the disc 147a, so that if the FF/REW mode selecting lever 146 has not been restrained from swinging around the partial arcuate wall 117 at the time when the large gear 154a or 155a is rotated by the gear 40, the lever 146 is swung in a predetermined direction. Thus, when the motor 35 is driven in its normal direction, the rotating member 38 is rotated in its clockwise direction in FIG. 1, so that the pair of large gears 154a and 155a driven in their counterclockwise directions by the gear 40 of the rotating member 38 give such a moment to the fast mode/-rewind mode selecting lever 146 as to make the lever 146 swing in its clockwise direction to have the gear 154a meshed with the gear 125 (the fast forward mode), and when the motor 35 is driven in its reverse direction, the FF/REW mode selecting lever 146 is given such a moment so that the lever 146 rotates in a counterclockwise direction in FIG. 1 so as to have the gear 155a meshed with the gear 22'a (the rewind mode).

Figure 15:
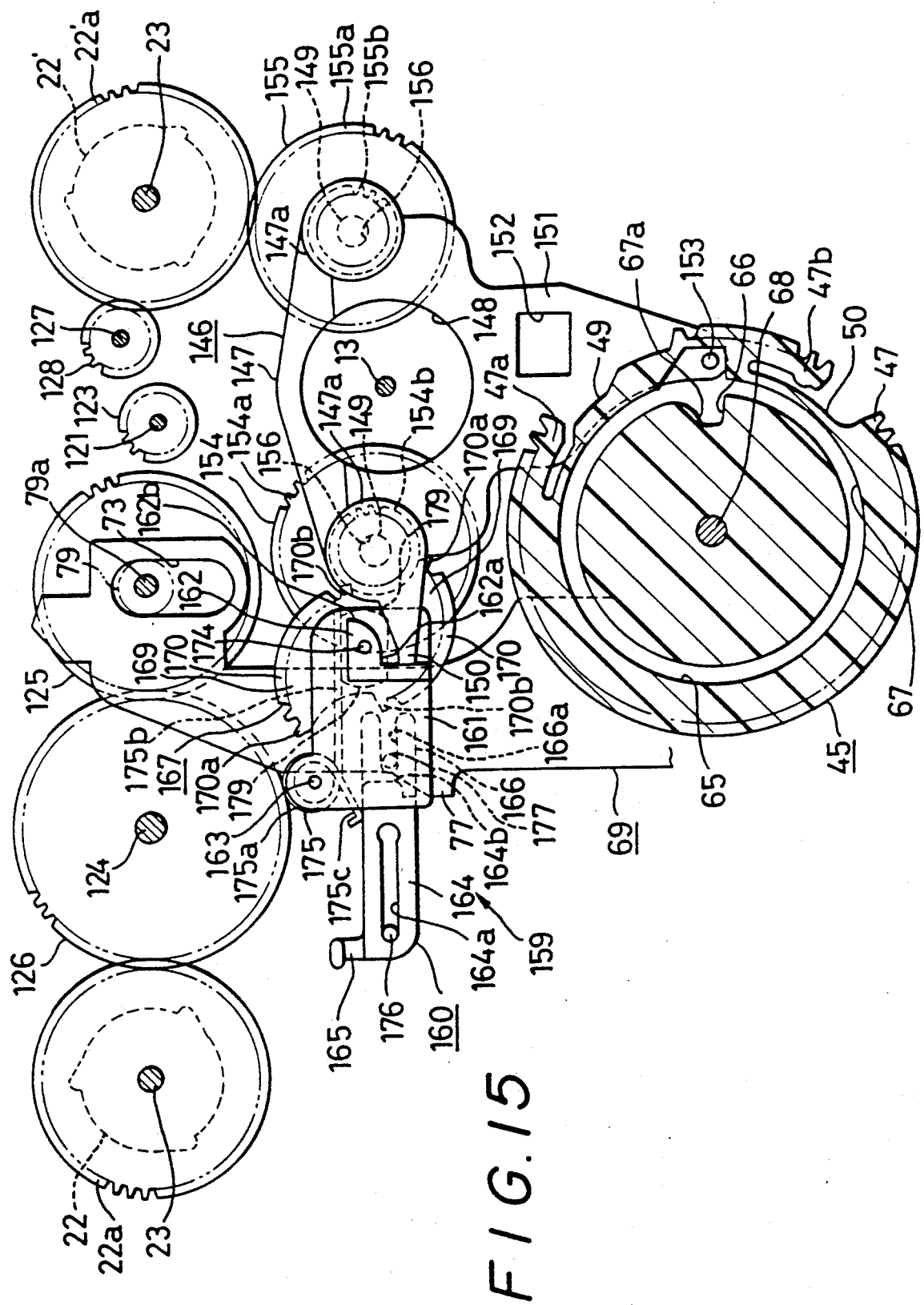
FIG. 15 is a bottom view with parts omitted for purposes of illustration of the tape transport apparatus of FIG. 1 while is in rewind mode.
Figure 16A:
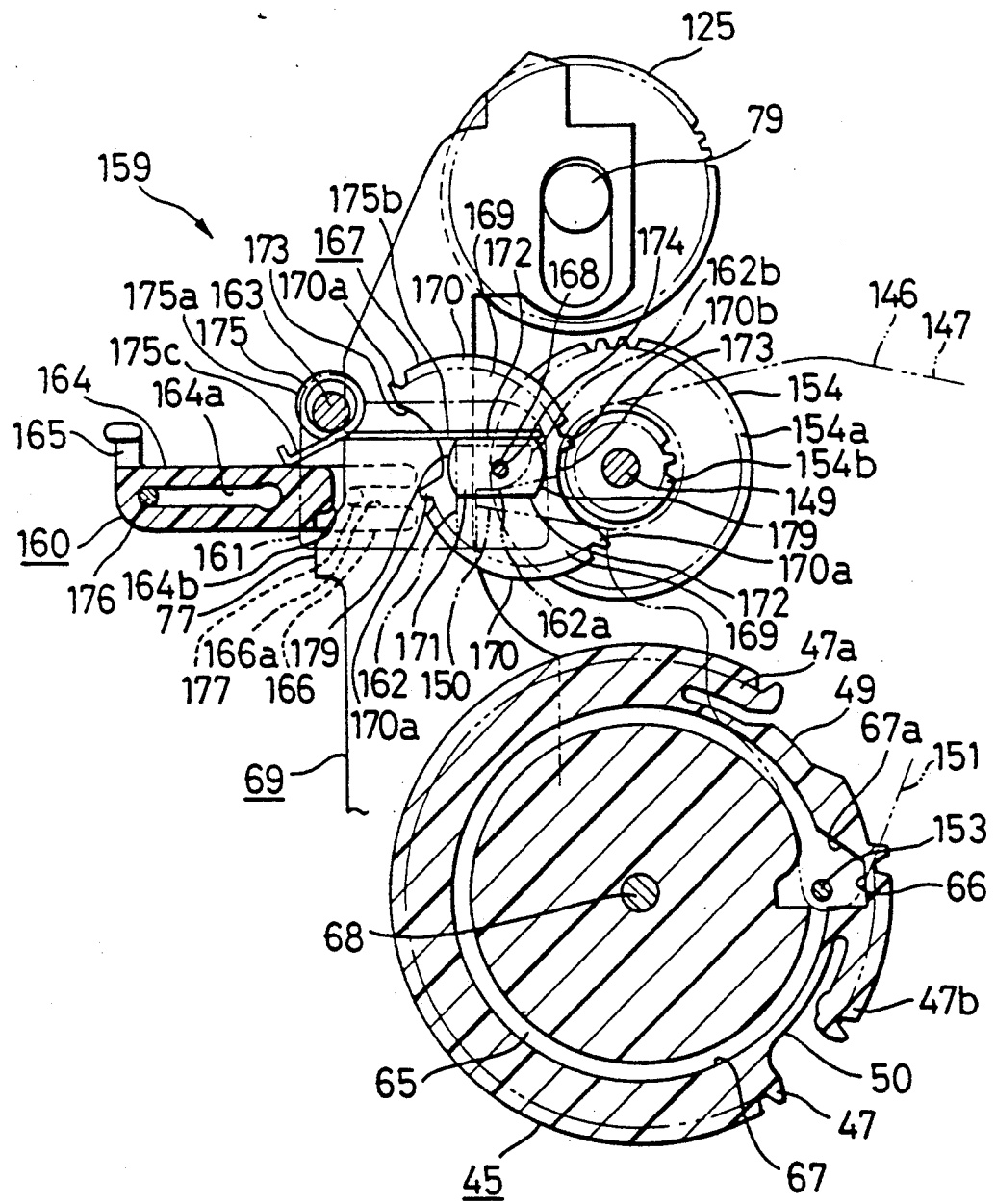
FIGS. 16A to 16C are plan views which illustrate, in turn, the motion of the fast forward/rewind mode selecting lever regulation mechanism of FIG. 14 until the fast forward mode of the apparatus is obtained.

In the meanwhile, the FF/REW mode selecting lever 146 is not restrained from swinging around the partial arcuate wall 117 only when the apparatus is in its stop mode. That is, when the apparatus 1 is in its stop mode, the cam means 45 is in the first nonrotatable position as shown in FIGS. 15 and 16, so that the projection 153 of the lever 146 is in the release portion 66 of the groove 65, but while the mode of the apparatus 1 is changed from its stop mode to its play mode, or vice versa, the projection 153 of the lever 146 is in the restraint portion 67 of the groove 65, for example, as shown in FIG. 17. It is noted that when the lever 146 is not restrained, the lever 146 is in the position where the large gears 154a and 155a do not engage but face the gears 125 and 22'a as shown in FIG. 1, respectively.

FF/REW MODE SELECTING LEVER REGULATION MECHANISM

The fast forward mode starts from the stop mode as described above, and similarly, the play mode starts from the stop mode. In addition, when the play mode is selected, the motor 35 has been also rotated in its normal direction. Therefore, it becomes necessary to regulate the motion of the FF/REW mode selecting lever 146. For example, upon selecting the play mode, the projection 153 of the FF/REW mode selecting lever 146 is moved to the position shown in FIG. 16C, so that the cam means 45 can not be easily rotated, because it becomes difficult for the projection 153 to be smoothly fitted into the restraint portion 67 of the cam groove 65. Further, even if the projection 153 is smoothly fitted into the restraint portion 67, the gear 154a is, just before then, meshed with the gear 125, and the apparatus 1 is to be under the state of the fast forward mode, so that the magnetic tape 18 begins very unstably running, when the pinch roller 32 or 32' is pressed against the capstan 20 or 20'.

Thus, a mechanism 159 for regulating the motion of the FF/REW mode selecting lever 146 (hereinafter designated as a FF/REW mode selecting lever regulation mechanism) comprises a translation cam 160, which is moved between a first position locking the FF/REW mode selecting lever 146 so that the lever 146 cannot swing in its clockwise direction and a second position unlocking the lever 146, and an eccentric gear 167, which moves the translation cam 160 in cooperation with the intermediate gear 154 to have the magnetic tape 18 run at high speed in the play mode.

Figure 14:
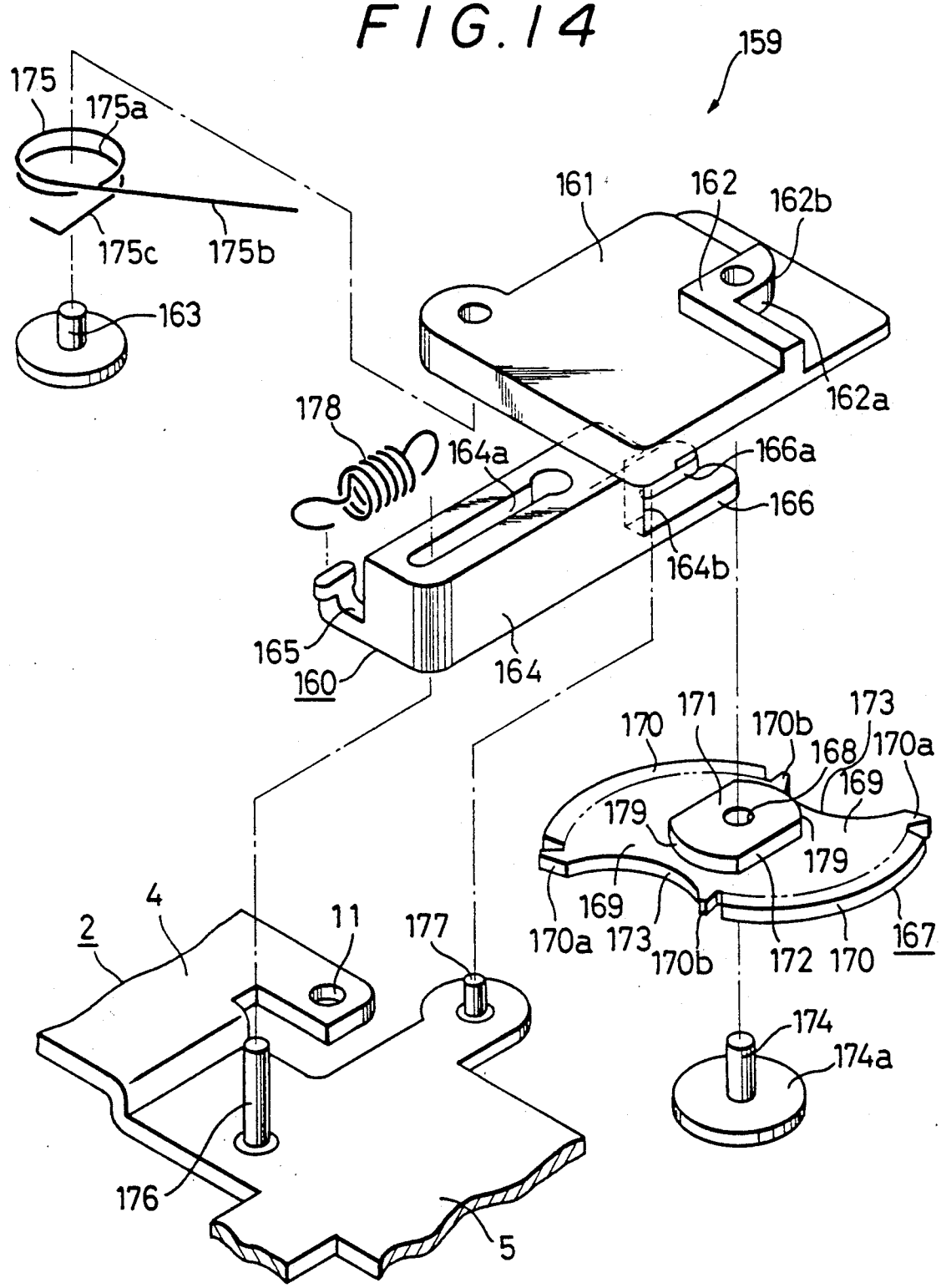
FIG. 14 is an exploded, perspective view, on an enlarged scale, of a fast forward/rewind mode selecting lever regulation mechanism that is incorporated in the tape transport apparatus embodying the invention.

As shown in FIG. 14, an L-shaped cam projection 162 is disposed at the right side of the rectangular base portion 161 of the translation cam 160. As shown in FIG. 1, the cam face of the cam projection 162, which comprises a linear cam face 162a and a curved cam face 162b, is coupled with the cam follower 150 which projects from the FF/REW mode selecting lever 146.

In the translation cam 160 shown in FIG. 14, a thick guided portion 164 extends to the left from the base portion 161, and a thin guided portion 166 extends to the right from the right end of the guided portion 164 and has a slot 164a and a U-shaped groove 166a, respectively. Guide pins 176 and 177, which project from the left intermediate portion 5 of the chassis 2 as shown in FIG. 4, are loosely fitted into the slot 164a and groove 166a, respectively, so that the translation cam 160 can move in the right to left direction, or vice versa in FIGS. 16A to 16C due to the guidance of the guide pins 176 and 177.

A spring stop or anchor 165 is provided on a side of the guided portion 164, and a tension spring 178 is stretched between the spring stop 165 and the spring stop 11 of the chassis 2 as shown in FIG. 1, so that the translation cam 160 is urged to the right in FIG. 1. It is to be noted that the left side, in FIG. 1, of the slider 69 is inserted into a gap formed between the base portion 161 and the guided portion 166 of the translation cam 160, and the projection 77 projecting from the left edge of the slider 69 can come into contact with the right edge 164b of the guided portion 164 of the translation cam 160 as shown in FIG. 17.

A pivot 174 (FIG. 14) has a flange 174a at one end thereof, and the other end is fitted into a hole provided on the right side of the base portion 161 of the translation cam 160, and held tight by the base portion 161. The pivot 174 is loosely fitted into an aperture 168 provided in an eccentric gear 167. The eccentric gear 167 is sandwiched between the base portion 161 and the flange 174a and is rotatable on the pivot 174.

The eccentric gear 167 comprises a pair of sector gears 169 which are symmetric with respect to the aperture 168, and distances between the toothed portion 170 of the sector gears 169 and the aperture 168 viewed from above the gear 167 become gradually large in the counterclockwise direction. The pair of sector gears 169 can be meshed with a small gear 154b of the intermediate gear 154 which is rotatably secured to the FF/REW mode selecting lever 146 shown in FIG. 4. The end 170a of one toothed portion 170, which is at the largest distance from the aperture 168, is connected by a concave edge 173 with the end 170b of the other toothed portion 170, which is at the smallest distance from the aperture 168, and vice versa.

An oval-shaped projection 171 is provided at the center of the lower side of the eccentric gear 167 as shown in FIG. 14, and has a pair of parallel linear or flat sides 172 which face the respective toothed portions 170 of the gear 167. A pin 163 with a flange is fixedly secured to the left side, in FIG. 14, of the base portion 161 of the translation cam 160, and a coiled portion 175a of a torsion coiled spring 175 is put on the pin 163.

As shown in FIG. 15, one linear end 175b of the spring 175 is pressed against the oval-shaped projection 171 of the eccentric gear 167, and the other crooked end 175c of the spring 175 is pressed against the side of the guided portion 164 of the translation cam 160. Thus, the eccentric gear 167 is restrained from rotation due to the elastic force of the spring 175, when the linear end 175b of the spring 175 abuts against the linear side 172 of the projection 171 as shown in FIG. 15.

The regulation of the FF/REW mode selecting lever 146 will be put in action as follows. In the stop mode shown in FIG. 16A, the guide pin 176 of the chassis 2 abuts against the left end of the slot 164a, so that the translation cam 160 can not move away more to the right, and the cam follower 150 projecting from the FF/REW mode selecting lever 146 is coupled with the linear cam face 162a of the translation cam 160, so that the FF/REW mode selecting lever 146 is located in its neutral position. One of the ends 170b of the toothed portions 170, which is at the smallest distance from the aperture 168, is meshed with the small gear 154b which is rotatably secured to the lever 146, and the projection 77 of the slider 69 is near the right edge 164b of the guided portion 164 of the translation cam 160. Thus, if the motor 35 is started in its normal direction, the FF/REW mode selecting lever 146 is not swung and is held in its neutral position, because the cam follower 150 of the lever 146 has abutted against the linear cam face 162a of the translation cam 160.

However, as the motor 35 is rotated in its normal direction, the intermediate gears 154 and 155 are rotated in the counterclockwise direction in FIG. 1, so that the eccentric gear 167 is rotated in the clockwise direction. At that time, as the distance between the toothed portion 170 and the center 168 of the eccentric gear 167 becomes gradually larger, the translation cam 160 is moved to the left in FIG. 16A against the force of the spring 178, so that the cam follower 150 projecting from the FF/REW mode selecting lever 146 relatively slides in the right direction with respect to the linear cam face 162a of the translation cam 160. As the eccentric gear 167 is rotated, the left end of the linear side 172, in FIG. 16A, of the oval-shaped projection 171 pushes the linear end 175b of the spring 175 to put the linear end 175b on the cylindrical end 179 of the oval-shaped projection 171. It is noted that when the contact of the linear end 175b of the spring 175 with the cylindrical end 179 of the projection 171 occurs at a position beyond the center of the cylindrical end 179, the eccentric gear 167 is then urged in the clockwise direction by the force of the spring 178.

Figure 16B:
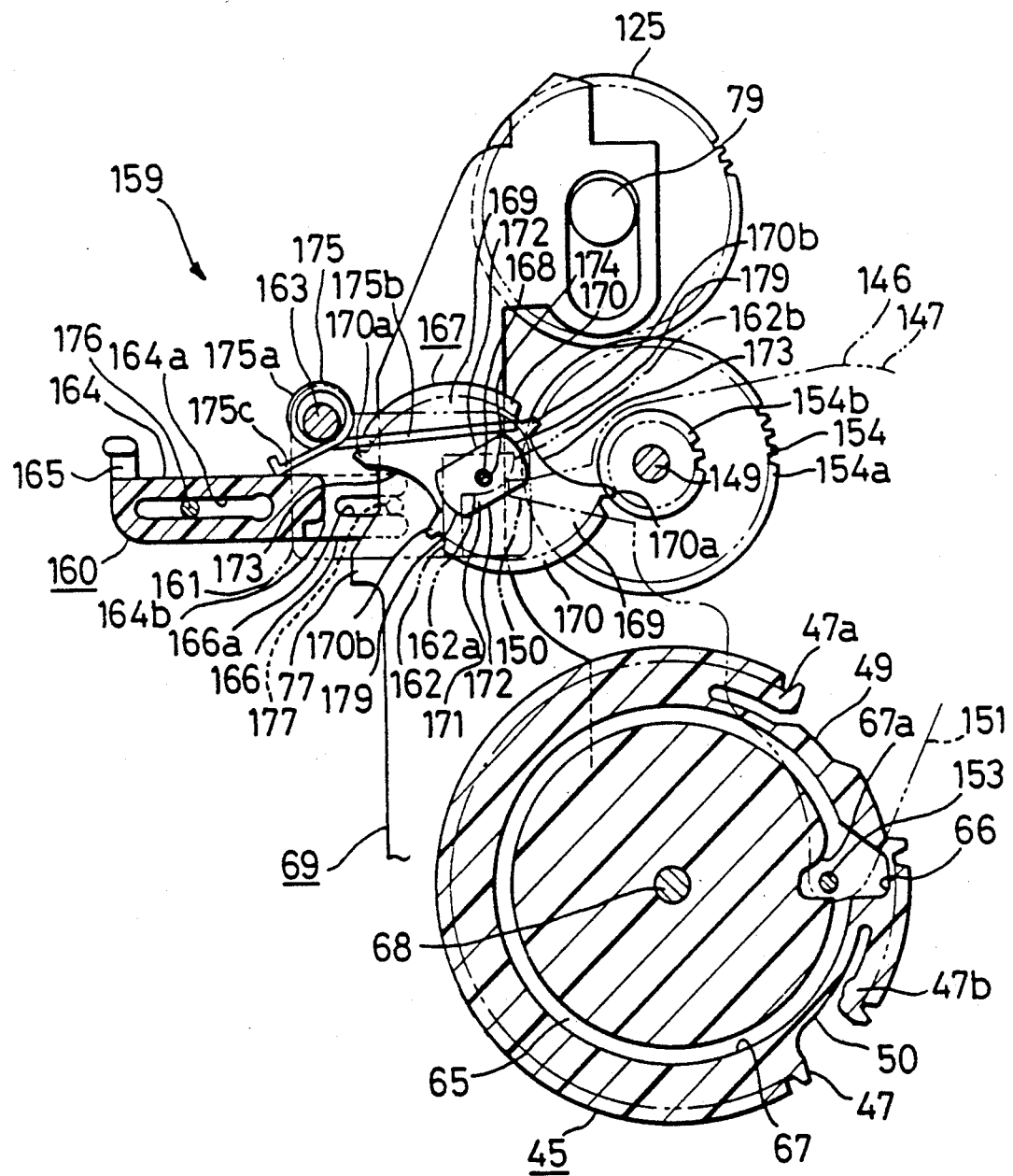

Next, as the engagement of the toothed portion 170 of the eccentric gear 167 with the small gear 154b of the FF/REW mode selecting lever 146 comes near the end 170a of the toothed portion 170 which is at the largest distance from the aperture 168 of the eccentric gear 167, the end of the cam follower 150 is coupled with the curved cam face 162b of the translation cam 160 as shown in FIG. 16B. Thus, the FF/REW mode selecting lever 146 begins to swing in the clockwise direction, and as soon as the cam follower 150 is free from the cam face 162b, the large gear 154a of the intermediate gear 154 is meshed with the gear 125, and substantially at the same time, the eccentric gear 167 is disengaged from the small gear 154b.

Figure 16C:
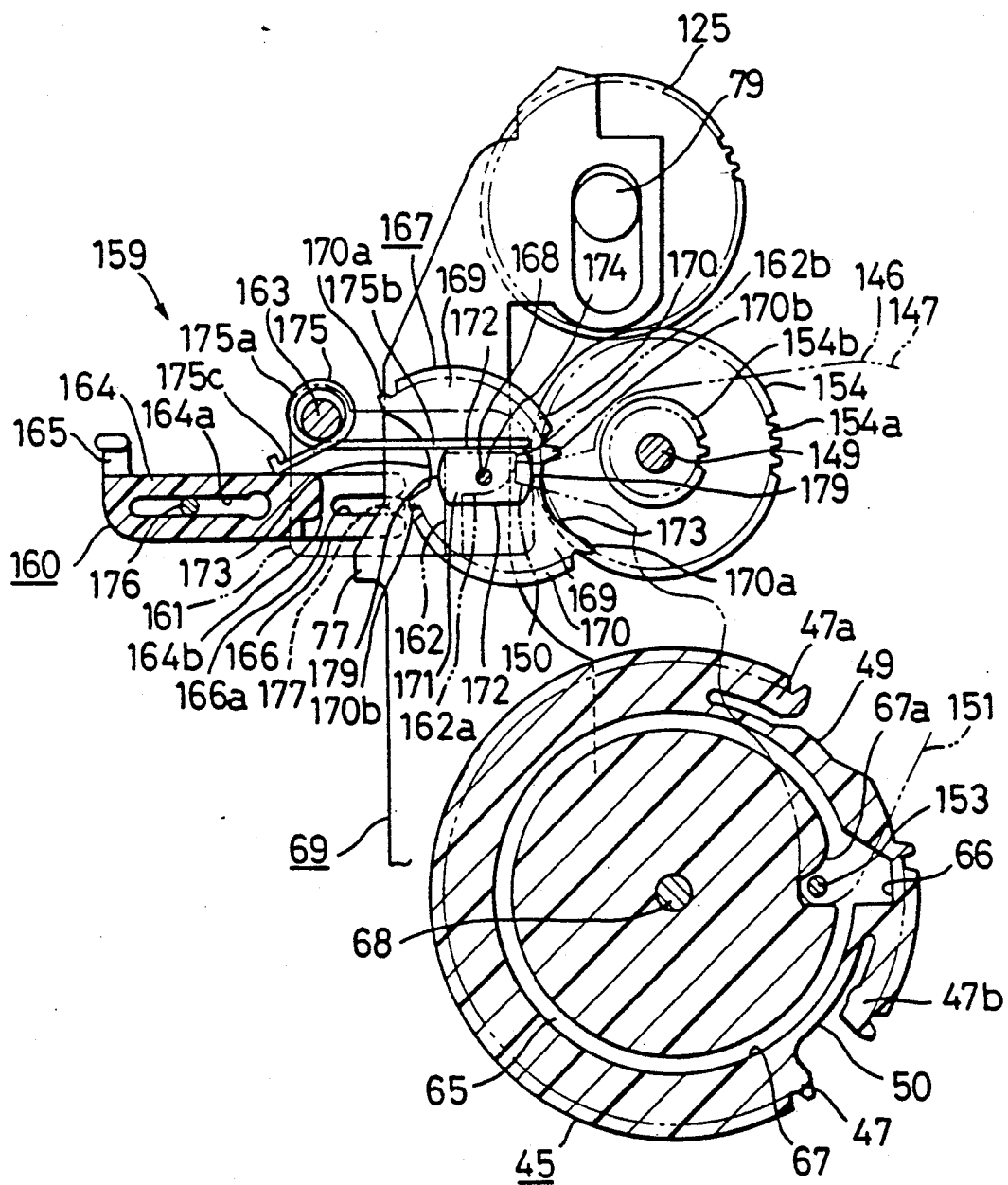

Therefore, the eccentric gear 167 is rotated by the force of the spring 175 until the gear 167 reaches such a state shown in FIG. 16C that the linear end 175b of the spring 175 is uniformly in contact with the linear or flat side 172 of the oval-shaped projection 171. At that time, the forefront of the cam follower 150 provided in the FF/REW mode selecting lever 146 abuts against a substantially vertical portion, in FIG. 16C, of the curved cam face 162b, so that the translation cam 160 moved against the force of the spring 178 may be held in a position shown in FIG. 16C. Thus, the fast forward mode is obtained.

When the fast forward mode is to be changed, the motor 35 is temporarily rotated in its reverse direction. As soon as the motor 35 is started the FF/REW mode selecting lever 146 is swung in the counterclockwise direction in FIG. 1 so as to make the cam follower 150 shown in FIG. 16C disengage from the curved cam face 162b, and as the result, the translation cam 160 is returned to the position shown in FIG. 1 by the force of the spring 178. It is to be noted that the temporary rotation of the motor 35 is stopped within a short time by the use of a brake.

In the meanwhile, the motor 35 is rotated in the same direction in the play mode as in the fast forward mode, so that when the mode is changed from the fast forward mode to the play mode, it seems better not to stop the motor 35. But in the fast forward mode, the magnetic tape 18 is run at high speed, so that if the pinch roller 32 or 32' is pressed against the capstan 20 or 20', the magnetic tape 18 is excessively stretched. Therefore, even when the mode is changed from the fast forward mode to the play mode, the motor 35 is temporarily rotated in its reverse direction so as to obtain the stop mode, and then, rotated again in its normal direction to obtain the play mode.

As described above, the FF/REW mode selecting lever 146 does not swing as soon as the motor 35 is started, so that when the play mode is selected, a current is supplied to the electromagnet 81 before the FF/REW mode selecting lever 146 starts in swinging. Thus, the cam means 45 is rotated, and the projection 153 of the FF/REW mode selecting lever 146 is easily guided to the restraint portion 67 of the cam groove 65 from the release portion 66 so as to restrain the FF/REW mode selecting lever 146 from swinging.

For the duration of the projection 153 being guided in the restraint portion 67, the cam follower 150, which projects from the FF/REW mode selecting lever 146, relatively slides on the linear cam face 162a of the translation cam 160 in the direction of being made free from the cam 160, because the small gear 154b meshed with the eccentric gear 167 is rotated as soon as the motor 35 is driven. However, the FF/REW mode selecting lever 146 can not swing when the cam follower 150 is free from the cam 160, so that the large gear 154a of the intermediate gear 154 is not meshed with the gear 125. In addition, the forefront of the cam follower 150 does not abut against the substantially vertical portion, in FIG. 16C, of the cam face 162b. Thus, the translation cam 160 is returned to the position shown in FIG. 1 by the force of the spring 178 as soon as the eccentric gear 167 is disengaged from the small gear 154b.

Thereafter, the eccentric gear 167 is again to be engaged with the small gear 154b, but before then, the slider 69 is moved forwards as shown in FIG. 9C and the projection 77 of the slider 69 abuts against the right edge 164b (FIG. 17) of the guided portion 164 of the translation cam 160. Thus, the end tooth 170b of the toothed portion 170, which is at the smallest distance from the aperture 168, cannot engage with the small gear 154b as shown in FIG. 17.

When the rewind mode is selected, the motor 35 is rotated in its reverse direction. Thus, the FF/REW mode selecting lever 146 is swung in its reverse direction in FIG. 1, and as the result, the small gear 154b is moved to a position shown in FIG. 15, where the small gear 154b faces the concave edge 173 of the eccentric gear 167, and thereby, the end tooth 170b of the toothed portion 170, which is at the smallest distance from the aperture 168, is disengaged from the small gear 154b. That is, the FF/REW mode selecting lever regulation mechanism is not put in action.

We claim:

1. A normal/reverse mode changing mechanism for a tape transport apparatus comprising:

mode selecting lever means being capable of swinging tape-transport-direction selecting lever means so as to engage power transmission gear means, which are secured to said tape-transport-direction selecting lever means, selectively with one of two reel bases, and further, pressing one of two pinch rollers against a corresponding one of two capstans, in correspondence with a tape-transport-direction selected from a first and second direction;

driving gear means;

cam means including a first locking cam, a pushing cam, and a restraining cam which has a first cam face and a second cam face, said first cam face being selectively coupled with a first cam follower provided in said mode selecting lever means to hold said mode selecting lever means in its first position so as to run a tape in said first tape-transport-direction, said second cam face being selectively coupled with said first cam follower to hold said mode selecting lever means in its second position so as to run said tape in said second tape transport direction, and said cam means having a gear which includes a toothless portion capable of facing said driving gear means, and is rotatable by said driving gear means when meshed with said driving gear means;

biasing means capable of rotating said cam means only in a predetermined direction;

electromagnet means;

first controlling lever means, which is swingable to disengage a second cam follower provided therein from said locking cam when a current is supplied to said electromagnet means;

second controlling lever means having a third cam follower which is coupled with said pushing cam of the cam means as said cam means is rotated, said first cam follower of the mode selecting lever means being coupled with said first cam face of the restraining cam, while said third cam follower is pushed by said pushing cam, and if a current is supplied to said electromagnet means, said first cam follower being coupled with said second cam face of the restraining cam; and current supply means for supplying currents to said electromagnet means, said first cam follower of the mode selecting lever means being automatically coupled with said first cam face of the restraining cam if a current is supplied once when said tape is to be run in said first tape transport direction, and said first cam follower being automatically coupled with said second cam face of the restraining cam if a current is supplied twice when said tape is to be run in said second tape transport direction.

2. A mechanism according to claim 1, in which said cam means has first and second toothless portions, and first and second locking cams, so that the stop mode of the apparatus may be obtained when said first toothless portion faces said driving gear means, and said second cam follower provided in the first controlling lever means is coupled with said first locking cam, and the play mode of said apparatus may be obtained when said second toothless portion faces said driving gear means, and said second cam follower is coupled with said second locking cam.

3. A mechanism according to claim 1, in which said locking cam, said pushing cam and said restraining cam which has said first and second cam faces to be coupled with said first cam follower of the mode selecting lever means, are provided on one side of said cam means, said cam means on another side is provided with a circular arc cam to be coupled with a fourth cam follower of a slider which can move at least a magnetic head between its play mode position and its stop mode position.

4. A mechanism according to claim 1, in which said cam means has a further restraining cam with an unrestrained portion, said further restraining cam being coupled with a fifth cam follower provided in a fast-transport-direction selecting lever means, said fifth cam follower being free from said further restraining cam while in said unrestrained portion, so that while said cam means is rotated, said fast-transport-direction selecting lever means, which supports a further pair of power transmission gear means of which one can engage selectively with one of the two reel bases in correspondence with the fast forward mode or the rewind mode of the apparatus, is held in a neutral position with neither of said further pair of power transmission gear means being engaged, and only when said apparatus is in the stop mode, said fast-transport-direction selecting lever means is swingable.

5. A mechanism according to claim 4, wherein said cam means includes a circular cam on one side thereof and wherein said further restraining cam and said unrestrained portion are provided in the same one side of said cam means as said circular cam.

6. A mechanism according to claim 1, in which said first cam face to be coupled with said first cam follower provided in the mode selecting lever means in order to hold said mode selecting lever means in its first position, and said second cam face to be coupled with said first cam follower in order to hold said mode selecting lever means in its second position are formed on the inner and outer peripheries of a circular arc projection, respectively.

7. A mechanism according to claim 1, in which said cam means has a second restraining cam to be coupled with said first cam follower, which is provided in the mode selecting lever means, in order to hold said mode selecting lever means in its neutral position, and an unrestrained range where said first cam follower is made free from said second restraining cam so as to make said mode selecting lever means swingable only when said cam means has a predetermined angle of rotation so that when the apparatus is in the stop mode and the fast forward/rewind mode, said tape-transport-direction selecting lever means is positioned so as not to engage said power transmission gear means secured thereto with either of said pair of reel bases.

8. A mechanism according to claim 7, in which said second restraining cam and said unrestrained range are provided in the same side of said cam means as said first-mentioned restraining cam.

9. A mechanism according to claim 1, in which said cam means is provided with a return cam capable of returning said first controlling lever means to such a position as to be engaged with said first locking cam during rotation of said cam means after a current is supplied to said electromagnet means.

10. A mechanism according to claim 9, in which said return cam is provided in the same side of said cam means as said first locking cam.

11. A mechanism according to claim 9, wherein said cam means has a second return cam and a second locking cam and said return cams are provided on the same side of said cam means on said locking cams.

12. A mechanism according to claim 1, in which said second controlling lever means is rotatably secured to said first controlling lever means so as to be moved together with said first controlling lever means when a current is supplied to said electromagnet means, and has a sixth cam follower to be coupled with a pushed cam which is provided on the edge of said mode selecting lever means, so that said sixth cam follower cooperates with said third cam follower to couple said first cam follower, which is provided in the mode selecting lever means, selectively with one of said first and second cam faces of the restraining cam.

13. A mechanism according to claim 12, in which when said first controlling lever means is not swung after said third cam follower is pushed by said pushing cam of the cam means, said first cam follower provided in the mode selecting lever means is coupled with said first cam face of the restraining cam due to function of said sixth cam follower, and when said first controlling lever means is swung due to application of electric current to said electromagnet means after said third cam follower is pushed by said pushing cam, said first cam follower is coupled with said second cam face of the restraining cam due to function of said sixth cam follower.

14. A mechanism according to claim 13, in which rotation regulating means for regulating the angle of rotation of said second controlling lever means is provided so that said first cam follower provided in the mode selecting lever means may be coupled with said second cam face of the restraining cam due to function of said sixth cam follower when said first controlling lever means is swung due to application of electric current to said electromagnet means.

* * * * *